(12) United States Patent
Balan

(10) Patent No.: US 11,461,723 B2
(45) Date of Patent: Oct. 4, 2022

(54) CLOUD-BASED, DATA-DRIVEN ARTIFICIAL INTELLIGENCE AND MACHINE LEARNING FINANCIAL PLANNING AND ANALYSIS VISUALIZATION PLATFORM

(71) Applicant: Rocky Mountain Innovations Insights LLC, Denver, CO (US)

(72) Inventor: Varun Balan, Denver, CO (US)

(*) Notice: Subject to any disclaimer, the term of this patent is extended or adjusted under 35 U.S.C. 154(b) by 0 days.

(21) Appl. No.: 16/524,981

(22) Filed: Jul. 29, 2019

(65) Prior Publication Data

US 2020/0034772 A1    Jan. 30, 2020

Related U.S. Application Data

(60) Provisional application No. 62/711,120, filed on Jul. 27, 2018.

(51) Int. Cl.
  *G06Q 10/06* (2012.01)
  *G06Q 40/00* (2012.01)
  *G06F 3/04847* (2022.01)

(52) U.S. Cl.
  CPC ..... *G06Q 10/06375* (2013.01); *G06Q 40/125* (2013.12); *G06F 3/04847* (2013.01)

(58) Field of Classification Search
  None
  See application file for complete search history.

(56) References Cited

U.S. PATENT DOCUMENTS

| 7,856,388 B1* | 12/2010 | Srivastava | G06Q 40/02 705/36 R |
| 2004/0138935 A1 | 7/2004 | Johnson et al. | |
| 2005/0144096 A1* | 6/2005 | Caramanna, II | G06Q 40/06 705/30 |
| 2005/0209943 A1 | 9/2005 | Ballow et al. | |

(Continued)

OTHER PUBLICATIONS

Gestel et al. (T. Van Gestel et al., "Financial time series prediction using least squares support vector machines within the evidence framework," in IEEE Transactions on Neural Networks, vol. 12, No. 4, pp. 809-821, Jul. 2001, doi: 10.1109/72.935093.).*

(Continued)

*Primary Examiner* — Matthew D Henry
(74) *Attorney, Agent, or Firm* — Duane Morris LLP

(57) ABSTRACT

A system for generating financial projections for a business entity and providing a graphical visualization of the financial projections on a display is disclosed herein. The system receives as an input actual financial data of said business entity. The system sorts said actual financial data into predefined categories. The system uploads the sorted actual financial data into a database. The system generates projected financial data comprising projected income, projected balance sheet, and variance between said actual financial data and said projected financial data using a plurality of predefined algorithms in conjunction with inputted user selectable variable parameter values. The system generates graphical visualizations of said actual and projected data. The system transmits the graphical visualizations for display (Continued)

in an interactive manner. The projected financial data visualizations are modified in dependence on a user changing one or more of said selectable variable parameter values.

2 Claims, 27 Drawing Sheets

(56) References Cited

U.S. PATENT DOCUMENTS

| | | |
|---|---|---|
| 2006/0010057 A1 | 1/2006 | Bradway et al. |
| 2012/0316904 A1 | 12/2012 | Eder |
| 2014/0136381 A1 | 5/2014 | Joseph et al. |
| 2015/0254556 A1* | 9/2015 | Getson .................... G06N 3/02 706/16 |

OTHER PUBLICATIONS

International Search Report and Written Opinion corresponding International Appln. No. PCT/US2019/043924 dated Dec. 2, 2019.
International Preliminary Report on Patentability corresponding International Appln. No. PCT/US2019/043924 dated Feb. 11, 2021.
Extended European Search Report from corresponding European Patent Appln. No. 19841653 dated Jul. 1, 2022.

* cited by examiner

RMI Insights

FirstName LastName
JobTitle

Source Data
KPI Dashboard
Financial Model
Monthly Budget
Valuations

Company Name  SubscriptionType (#DaysRemaining)

KPI Dashboard

Edit Dashboard

Total Revenue

| | Targets | Table / Visual Actuals | Variance |
|---|---|---|---|
| Current Month (Oct. 2019) | $15,442,262 | $14,515,726 | (6.0%) |
| Current Month (Jan–Oct. 2019) | $156,352,901 | $150,832,293 | (3.5%) |

Net Income

| | Targets | Table / Visual Actuals | Variance |
|---|---|---|---|
| Current Month (Oct. 2019) | $224,171 | $256,721 | 14.5% |
| Year to Date (Jan–Oct. 2019) | $2,281,946 | $1,749,835 | (23.3%) |

EBIT

| | Targets | Table / Visual Actuals | Variance |
|---|---|---|---|
| Current Month (Oct. 2019) | $427,365 | $425,085 | (0.5%) |
| Year to Date (Jan–Oct. 2019) | $4,486,734 | $4,432,457 | (1.2%) |

Gross Profit

| | Targets | Table / Visual Actuals | Variance |
|---|---|---|---|
| Current Month (Oct. 2019) | $2,838,756 | $2,786,904 | (1.8%) |
| Current Month (Jan–Oct. 2019) | $28,742,409 | $28,070,284 | (2.3%) |

EBITDA

| | Targets | Table / Visual Actuals | Variance |
|---|---|---|---|
| Current Month (Oct. 2019) | $459,828 | $455,554 | (0.9%) |
| Year to Date (Jan–Oct. 2019) | $4,655,757 | $3,748,713 | (19.5%) |

EBIT

| | Targets | Table / Visual Actuals | Variance |
|---|---|---|---|
| Current Month (Oct. 2019) | $352,387 | $348,702 | (1.0%) |
| Year to Date (Jan–Oct. 2019) | $3,568,907 | $3,497,245 | (2.0%) |

FIG. 2

Company: Nike-12121    Period: Y

Balance Sheet    Income Statement    Cash Flow Statement

| Revenues | Net revenue |
|---|---|
| Cost of sales | Cost of revenue |
| Gross profit | Gross profit |
| Demand creation expense | Demand creation expense |
| Operating overhead expense | Operating overhead expense |
| Total selling and administrative expense | Total selling and administrative expense |
| Interest expense – income net | Interest expense income net |
| Other expense – income net | Other expense income net |
| Income before income taxes | Income before income taxes |
| Income tax expense | Provision for income taxes |
| NET INCOME | Net income/loss |
| – Earnings per common share: | Earnings per common share |
| Basic | Basic |
| Diluted | Diluted |
| Dividends declared per common share | Dividends declared per common share |

Reset ↻    Save    Submit

FIG. 10A

| Income statement | | | |
|---|---|---|---|
| | | | MRY |
| | 2015 | 2016 | 2017 |
| Total Revenue | $3,956 | $3,600 | $4,019 |
| Cost of revenues | -$332 | -$212 | -$68 |
| Gross Profit | $3,624 | $3,388 | $3,951 |
| Sales & Marketing | -$1,650 | -$1,292 | -$1,459 |
| General & Administrative | -$362 | -$295 | -$564 |
| R&D | -$812 | -$748 | -$823 |
| Restructuring, separation, transition, other | -$164 | -$136 | -$273 |
| Ebitda | $636 | $917 | $832 |
| Depreciation | -$229 | -$213 | -$199 |
| Amortization | -$122 | -$86 | -$293 |
| Stock Based Compensation | -$131 | -$161 | -$440 |
| Ebit | $154 | $457 | -$100 |
| Interest Income | $11 | $10 | $21 |
| Interest Expense | -$78 | -$75 | -$208 |
| Other income, net | $14 | $0 | $25 |
| Income Before Taxes | $101 | $392 | -$262 |
| Income Tax Expense (Benefit) | $8 | -$1,213 | $26 |
| Income from Continuing Operations | $109 | -$821 | -$236 |
| Income from discontinued operations, net of income taxes | $769 | $3,309 | $130 |
| Preferred Dividends | $0 | $0 | $0 |
| Net Income | $878 | $2,488 | -$106 |

FIG. 10B

Balance Sheet    Company: Nike-12121    Period: Y
                 Income Statement       Cash Flow Statement

| ASSETS | Assets |
|---|---|
| − Current assets: | Current assets |
| Cash and equivalents | Cash equivalents |
| Short-term investments | Short-term investments |
| Accounts receivable net | Accounts receivable |
| Inventories | Inventories |
| Prepaid expenses and other current assets | Other current assets |
| Property plant and equipment net | Ppe(net) |
| Identifiable intangible assets net | Intangible assets |
| Goodwill | Goodwill |
| Deferred income taxes and other assets | Deferred income taxes and other assets |
| Total current assets | Total current assets |
| TOTAL ASSETS | Total assets |
| LIABILITIES AND SHAREHOLDERS' EQUITY | Liabilities and shareholders' equity |
| +Current liabilities: | Current liabilities |
| Shareholders' equity: | Shareholders' equity |
| +Common stock at stated value: | Common stock at stated value |

Reset ↻    Save    Submit

FIG. 11A

| Balance sheet | | | |
|---|---|---|---|
| | | | MRY |
| | 2015 | 2016 | 2017 |
| Assets | | | |
| | | | |
| Cash and equivalents | 2843 | 5983 | 4247 |
| Accounts receivable | 700 | 556 | 649 |
| Deferred tax assets | 152 | 0 | 0 |
| Other current assets | 1727 | 420 | 428 |
| Total current assets | 5422 | 6959 | 5324 |
| PP&E, net | 950 | 957 | 937 |
| Goodwill | 3146 | 3148 | 8627 |
| Intangible assets | 525 | 443 | 3004 |
| Equity investments | 10 | 157 | 158 |
| Other long-term assets | 3180 | 103 | 124 |
| Total Assets | 13233 | 11767 | 18174 |
| | | | |
| Liabilities and SE | | | |
| | | | |
| Accounts payable | 169 | 175 | 180 |
| Accrued Expenses | 232 | 219 | 272 |
| Income taxes payable | 181 | 1101 | 281 |
| Deferred revenue | 2871 | 2638 | 2787 |
| Other current liabilities | 1228 | 419 | 477 |
| Current portion of long-term debit | 350 | 0 | 1310 |
| Revolver | 0 | 0 | 0 |
| Total current liabilities | 5031 | 4552 | 5307 |
| Long term debt | 1746 | 2207 | 6876 |
| Deferred tax liability | 308 | 1235 | 2401 |
| Other long-term liabilities | 213 | 97 | 103 |
| Total liabilities | 7298 | 8091 | 14687 |
| | | | |
| Common Stock/APIC | 6101 | 4309 | 4236 |
| Retained Earnings (Accumulated Deficit) | -270 | -655 | -761 |
| Treasury Stock | 0 | 0 | 0 |
| OCI | 104 | 22 | 12 |
| Total Equity | 5935 | 3676 | 3487 |
| | | | |
| Total Liabilities and SE | 13233 | 11767 | 18174 |

FIG. 11B

| Company: Nike-12121 | Period: Y |
|---|---|
| Balance Sheet | Income Statement | Cash Flow Statement |

| | |
|---|---|
| Cash provided by operation | Cash provided by operations |
| Net Income | Net Income/Loss |
| + Adjustments to reconcile net income to net cash provided by operations: | Adjustments to reconcile net income to net cash provided by operations |
| + Changes in certain working capital components and other assets and liabilities: | Changes in certain working capital components and other assets and liabilities |
| + Increase-decrease in accounts payable accrued liabilities and other current and | Increase decrease in accounts payable accrued liabilities and other current and |
| Cash provided by operations | Cash provided by operations |
| + Cash provided-used by investing activities: | Cash provided used by investing activities |
| Cash provided-used by investing activities | Cash provided used by investing activities |
| + Cash used by financing activities: | Cash used by financing activities |
| Cash used by financing activities | Cash used by financing activities |
| Effect of exchange rate changes on cash and equivalents | Effect of exchange rate changes on cash and equivalents |
| Net increase-decrease in cash and equivalents | Net change in cash |
| Cash and equivalents beginning of year | Cash beginnings |
| CASH AND EQUIVALENTS END OF YEAR | Cash ending |
| Supplemental disclosure of cash flow information: | Supplemental disclosure of cash flow information |
| + Cash paid during the year for: | Cash paid during the year for |
| Non-cash additions to property plant and equipment | Non cash additions to property plant and equipment |
| Dividends declared and not paid | Dividends declared and not paid |

[RESET ↺]   [SAVE]   [SUBMIT]

FIG. 12A

| Cash Flow Statements | | | MRY | | | |
|---|---|---|---|---|---|---|
| | 2015 | 2016 | 2017 | 2018 | 2019 | 2020 |
| Operating Activities | | | | | | |
| | | | | | | |
| Net Income | | | | 7 | 120 | 143 |
| Depreciation | | | | 166 | 331 | 383 |
| Amoritzation of intangibles | | | | 149 | 296 | 342 |
| Stock-based compensation | | | | 176 | 350 | 405 |
| Deferred Income Taxes | | | | 0 | 0 | 0 |
| | | | | | | |
| Changes in operating Assets, liabilities | | | | | | |
| Accounts Receivable | | | | 201 | -444 | -140 |
| Accounts Payable | | | | 64 | 242 | -36 |
| Deferred Tax Assets | | | | 0 | 0 | 0 |
| Accrued Expenses | | | | -85 | 185 | 59 |
| Income taxes Payable | | | | 0 | 0 | 0 |
| Deferred Revenue | | | | -706 | 2060 | 652 |
| Other Current Assets | | | | 101 | -324 | -102 |
| Other Current Liabilities | | | | 0 | 0 | 0 |
| | | | | | | |
| Cash Flow from operating | | | | 73 | 2817 | 1706 |
| | | | | | | |
| Investing Activities | | | | | | |
| | | | | | | |
| CapEx | | | | -208 | -414 | -479 |
| Other Long Term Assets | | | | 35 | -88 | -28 |
| Goodwill | | | | 0 | 0 | 0 |
| Purchases of Intangibles | | | | -268 | -532 | -616 |
| Equity Investments | | | | 158 | 0 | 0 |
| | | | | | | |
| Cash Flow from investing | | | | -283 | -1035 | -1124 |
| | | | | | | |
| Financing Activities | | | | | | |
| ST Debt | | | | 0 | -315 | 0 |
| LT Debt | | | | -1592 | -39 | 162 |
| Other LT Liabilities | | | | 0 | 0 | 0 |
| New Share Issuance | | | | 0 | 0 | 0 |
| Share Repurchasers | | | | | | |
| OCI | | | | 0 | 0 | 0 |
| Common Dividend | | | | -3242 | 1540 | -692 |
| Revolver | | | | 0 | 0 | 0 |
| | | | | | | |
| Cash Flow from financing | | | | -4835 | 1185 | -530 |
| | | | | | | |
| Change in Cash | | | | -5044 | 2968 | 53 |

FIG. 12B

CLOUD-BASED, DATA-DRIVEN ARTIFICIAL INTELLIGENCE AND MACHINE LEARNING FINANCIAL PLANNING AND ANALYSIS VISUALIZATION PLATFORM

CROSS-REFERENCE TO RELATED APPLICATIONS

This application claims priority to U.S. Provisional Application Ser. No. 62/711,120, filed Jul. 27, 2018, which is hereby incorporated by reference in its entirety.

BACKGROUND

Financial Planning and Analysis for companies is typically performed by various individuals using spreadsheet programs such as Microsoft® Excel®, but the results are not properly aggregated, analyzed, synthesized, reported, shared and visualized among all stakeholders in a standardized fashion.

Conventional systems, such as Microsoft® Excel®, are used to track and sort financial and operational data. Furthermore, Microsoft® Excel® is used to perform various mathematical and statistical operations on these data sets. While Excel® is a great tool for data collection and a common component in analytics toolkits, it is only a starting-point for data analysis. Using such systems is an inexact, disorganized process where all key stakeholders of a business entity are rarely aligned.

There is thus a need for a process and system that provides comprehensive financial analysis with visualization for a plurality of stakeholders.

In addition, there is a lack of clarity for stakeholders in terms of how a company is performing as compared to its projected potential. Financial modeling has historically been human and not software driven.

It is evident that a machine learning-based software platform that automates the financial modeling process and emphasizes/visualizes comparisons between the projections made by the model and a company's historical financial data is highly needed and very powerful.

SUMMARY

A computer program product is provided for automatically generating financial projections, valuations and comparisons and for display, the computer program product comprising a non-transitory computer readable storage medium ("software") having computer readable program code embodied therewith, the computer readable program code being configured to: record client financial data in a database.

The system receives a request from a client for financial projections, retrieves from the database financial records data of the client; automatically calculates from the financial records actuals data, projections data and valuations of the client's actual and projected financial positions; and generates an interactive user interface display of the calculated valuations, wherein client selection of features and data on the user interface triggers a graphical display of the valuations and financial positions.

In some embodiments, a system for generating financial projections for a business entity and providing a graphical visualization of the financial projections on a display is disclosed herein. The system includes a processor and a memory. The memory has programming instructions stored thereon, which, when executed by the processor performs one or more operations. The one or more operations include receiving as an input actual financial data of said business entity. The one or more operations further include sorting said actual financial data into predefined categories. The one or more operations further include uploading the sorted actual financial data into a database. The one or more operations further include generating projected financial data comprising projected income, projected balance sheet, and variance between said actual financial data and said projected financial data using a plurality of predefined algorithms in conjunction with inputted user selectable variable parameter values. The one or more operations further include generating graphical visualizations of said actual and projected data. The one or more operations further include transmitting the graphical visualizations for display in an interactive manner. The projected financial data visualizations are modified in dependence on a user changing one or more of said selectable variable parameter values.

In some embodiments, a computer program product for automatically generating financial projections and valuations for a plurality of clients and for display is disclosed herein. The computer program product includes a non-transitory computer readable storage medium having computer readable program code stored thereon. The computer readable program code is configured to record client financial data in a database. The computer readable program code is further configured to receive a request from a client for financial projections. The computer readable program code is further configured to retrieve from the database, financial records data for the client. The computer readable program code is further configured to automatically calculate from the financial records data, projections and valuations of the client's actual and projected financial position along with variances. The computer readable program code is further configured to generate an interactive user interface display of the calculated projections, corresponding projected valuations, and variances between actual and system-generated projections wherein client selection of features and data on the user interface triggers a graphical display of the actual and projected valuations and financial statements.

In some embodiments, a system for automating financial data visualization through the use of artificial intelligence and machine learning is disclosed herein. The system includes a file upload receive, an extract unit, a valuation unit, and an interactive visualization unit. The file upload receiver is configured to receive raw data. The raw data includes historical financial statements, balance sheet, statement of income, and statement of cashflows. The extraction unit is configured with machine learning software to identify each line item in the balance sheet, statement of income, and statement of cashflows. The valuation unit is configured to draw from the data collected by the file receiver and extracted by the extraction unit to be plugged into a standardized financial model proprietary to the software. The interactive visualization unit is configured to display the information gathered from the extraction unit and evaluated by the valuation unit in the form of graphs, visual representations, and financial modeling on the system's visual dashboard.

In some embodiments, the file upload receiver is configured to receive financial statements from one or more user devices.

In some embodiments, the extraction unit is further configured to identify key line items and numerical values corresponding to the key line items and the extracted information embedded in the financial statements.

In some embodiments, the valuation unit is configured to determine one or more key drivers for revenue line items exceeding 20% of total revenue and expense line items exceeding 10% of total expenses.

In some embodiments, the interactive visualization unit is further configured to create real-time, visual financial projections by adjusting monthly revenue proportions.

In some embodiments, the interactive visualization unit is configured to display a comparison between user industry-specific financial projections to actual monthly financial reports through a data visualization dashboard.

In some embodiments, the data visualization dashboard is configurable by the user by uploading current financial reports to the financial upload receiver.

In some embodiments, the data visualization dashboard is configured to display variance between projected and actual financial reports.

In some embodiments, the extraction unit is further configured to extract raw income statement data, balance sheet data, and cash flow statement data.

In some embodiments, the raw income statement data, balance sheet data, and cash flow statement data can be used to reconcile changes in different statement items as changes in cash in order to link all three financial statements together.

In some embodiments, the visualization unit is further configured to manipulate monthly percentages of total annual revenue responsive to detecting user input.

In some embodiments, the user input includes sliding a mouse or other manipulatable interface to adjust monthly slider bars.

In some embodiments, the valuation unit is further configured to calculate valuation multiples by evaluating at least one or more of a company's industry, geography, revenue, and size of company and employees.

BRIEF DESCRIPTION OF THE FIGURES

The detailed description of some embodiments of the invention is made below with reference to the accompanying figures, wherein like numerals represent corresponding parts of the figures.

FIG. 2 is a screenshot of a dashboard user interface according to an embodiment of the subject technology, according to example embodiments.

FIGS. 10A and 10B are block diagrams illustrating exemplary input financials extracted via "Smart Import," according to example embodiments.

FIGS. 11A and 11B are block diagrams illustrating exemplary input financials extracted via "Smart Import," according to example embodiments.

FIGS. 12A and 12B are a block diagram illustrating exemplary input financials extracted via "Smart Import," according to example embodiments.

DETAILED DESCRIPTION

In general, embodiments of the disclosed subject technology take financial and operational data analysis to the next level with flexible and responsive analytics and visualizations that are easily shared among relevant stakeholders. Embodiments of the invention map all financial and operational data of an organization (private or public), business, and business unit. Aspects provide Executives and Investment Managers of the aforementioned entities with a 360° view of the entities that they run and manage on an actual and projected basis. As will be appreciated, Executives and Investment Managers will be able to visually identify, categorize, synthesize, and solve problems collaboratively with one another and other experts using a unified and standardized comprehensive presentation of all relevant financial and operational data.

Figure 9:
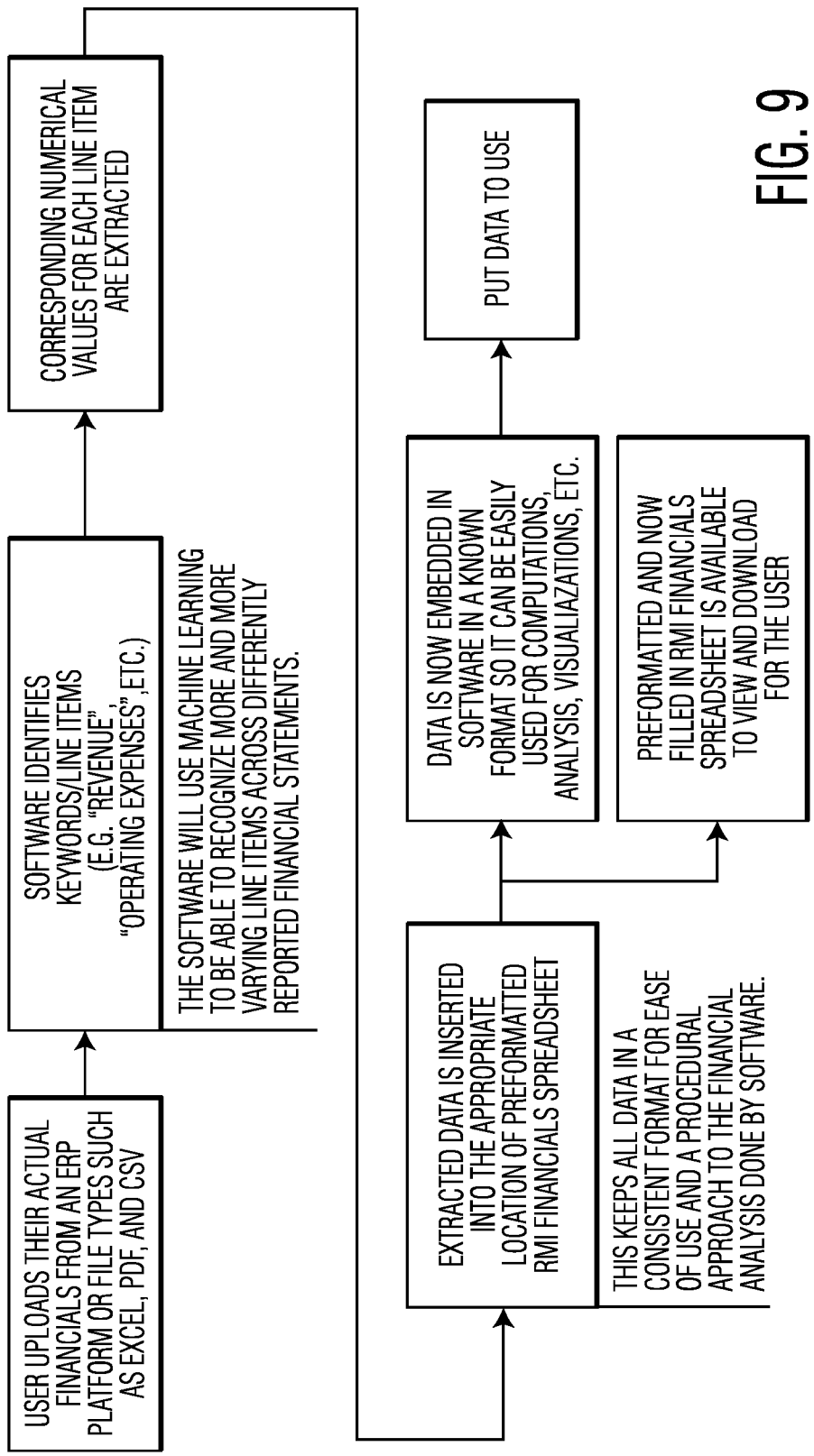
FIG. 9 is a flowchart outlining the "Smart Import" function utilized to extract and refine user input financial data, according to example embodiments.

To start, the actuals (Income Statement, Balance Sheet, and Cash Flow Statement) are initially imported into the system from an electronic file such as PDF, CSV, Word, etc. and the system utilizes a "smart import" function to acquire the data (see, e.g., FIG. 9). It does so by recognizing specific keywords (line items)[1], extracting their corresponding values and inserting that data into a preformatted spreadsheet which is embedded in the system (see, e.g., FIG. 9, Blocks B, C, and D). FIGS. 10A and 10B, 11A and 11B, and 12A and 12B illustrate further examples of the above. Major line items such as "Total Revenue", "EBITDA", "Total Assets", "Total Liabilities", "Cash Flow from . . . ", etc. are easily identified, and the corresponding components that make up the major line items will also be recognized. In addition, once this spreadsheet is filled it will be available for download by the user (see, e.g., FIG. 9, Block F). Now, the data is contained in the system in a way that is consistent and easy to use to create visualizations, projections, valuations, etc. (see FIG. 9, Block E). In addition, all input data will be uploaded into a database (e.g., MySQL database) so that this information can be utilized by the system when considering other client's data in the future.

Figure 21:
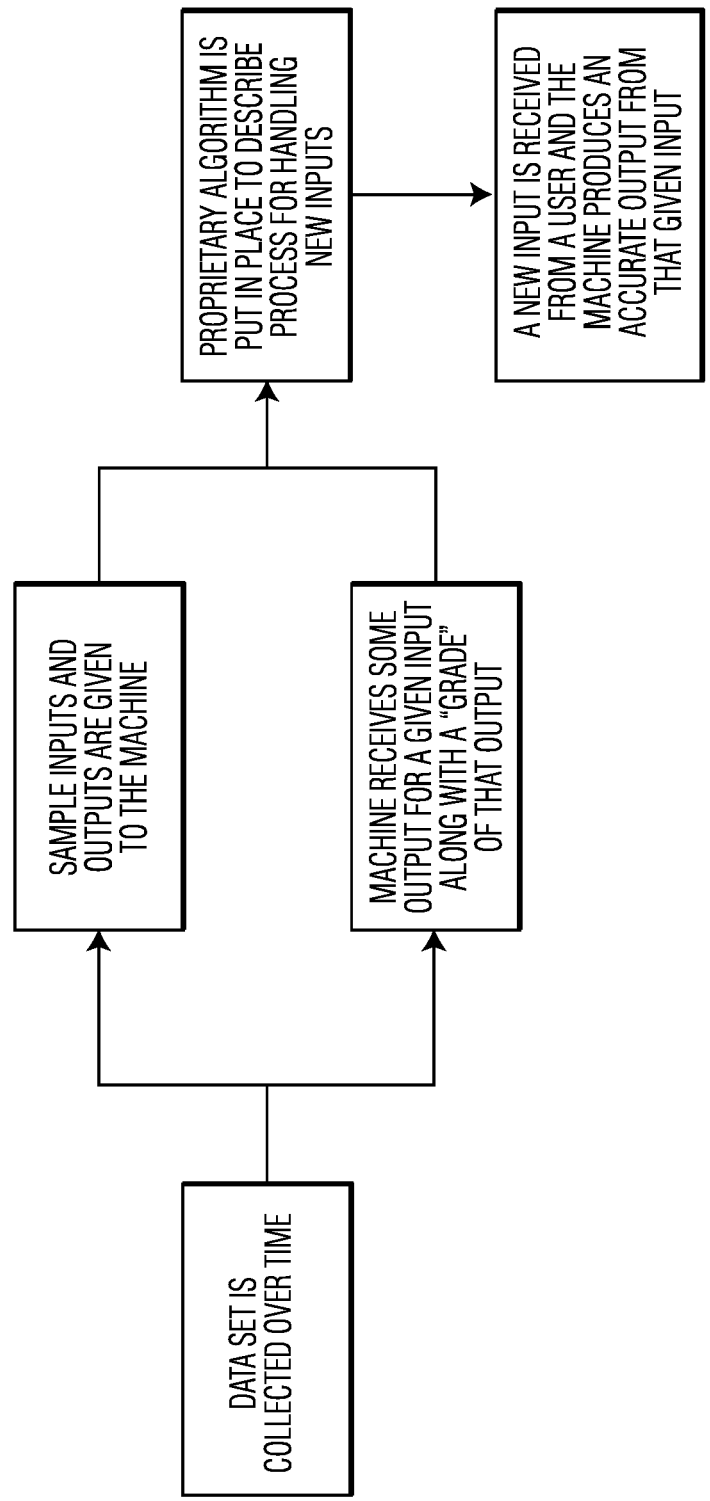
FIG. 21 is a flowchart describing the general machine learning (supervised and reinforcement learning) process utilized by the system for varying purposes, according to example embodiments.

[1] The system will have a growing list of line items and learn to recognize more and more data directly from a pdf (it will do so by utilizing both supervised learning based on an initial data set of financials and reinforcement learning from our continued review of how the system handles new data) (see FIG. 21).

Figure 13:
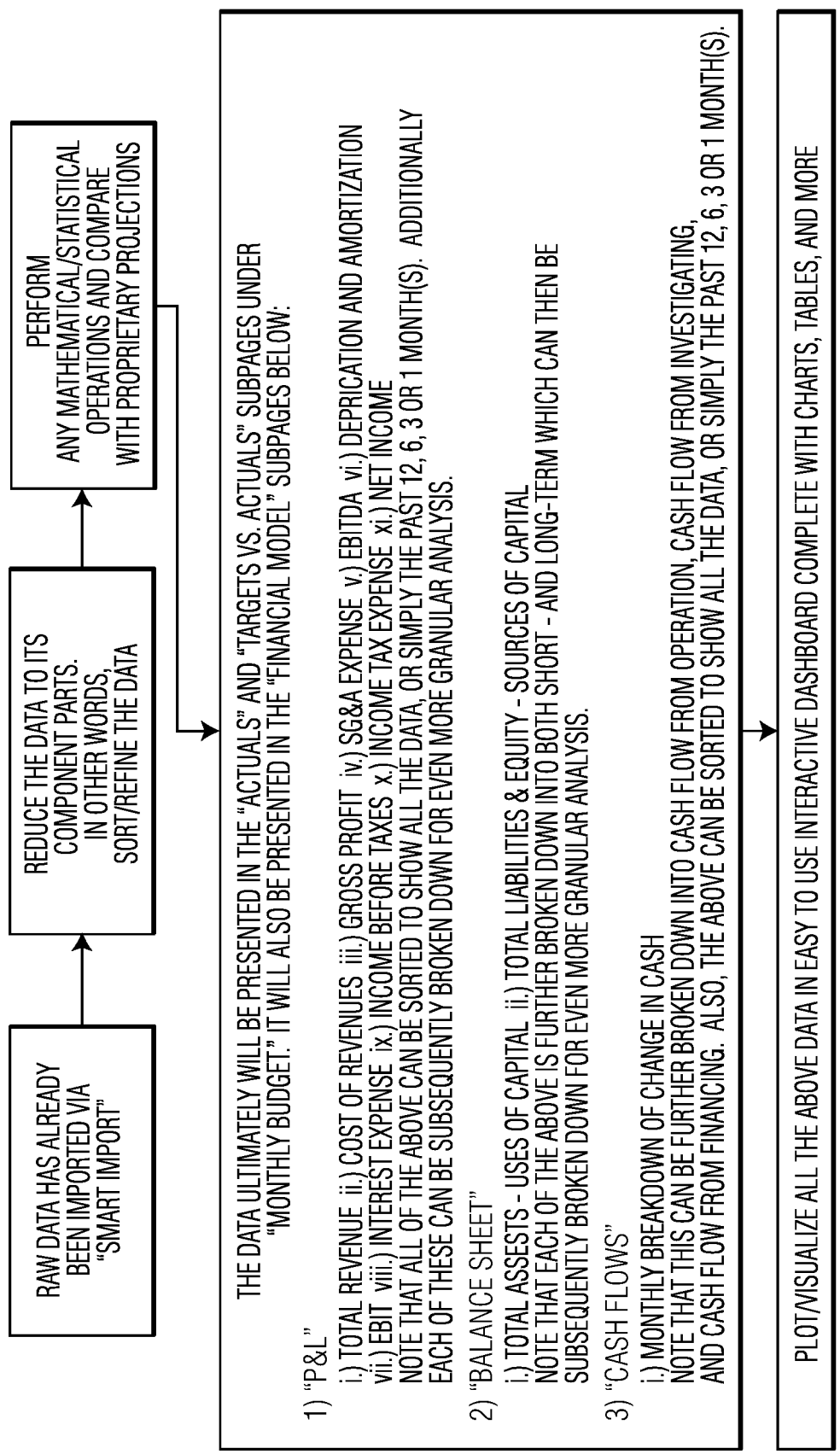
FIG. 13 is a flowchart describing the process for how historical financial data is sorted and visualized, according to example embodiments.

Referring now to FIG. 13, once the system has extracted the data it is synthesized, analyzed, and visualized to help the user. It does so by reducing the data to all its component parts (i.e. sorting revenue, expenses, etc. month by month and breaking the data down from things like total revenue to what makes up that total like total sales revenue, servicing revenue, varying fees, total secondary revenue etc.) (see, e.g., FIG. 13, Block B). After the data is effectively refined, necessary mathematical and statistical operations are performed to give a more in depth analysis of what the data is really conveying (i.e. aggregating and categorizing data, summing varying component parts, taking relevant ratios, etc.) (see, e.g., FIG. 13, Block C). In doing so all this sorted, broken down data, along with all the results of the varying calculations/manipulations of the data are elegantly visualized in an interactive environment of graphs and tables (see, e.g., FIG. 13, Block E).

Figure 3:
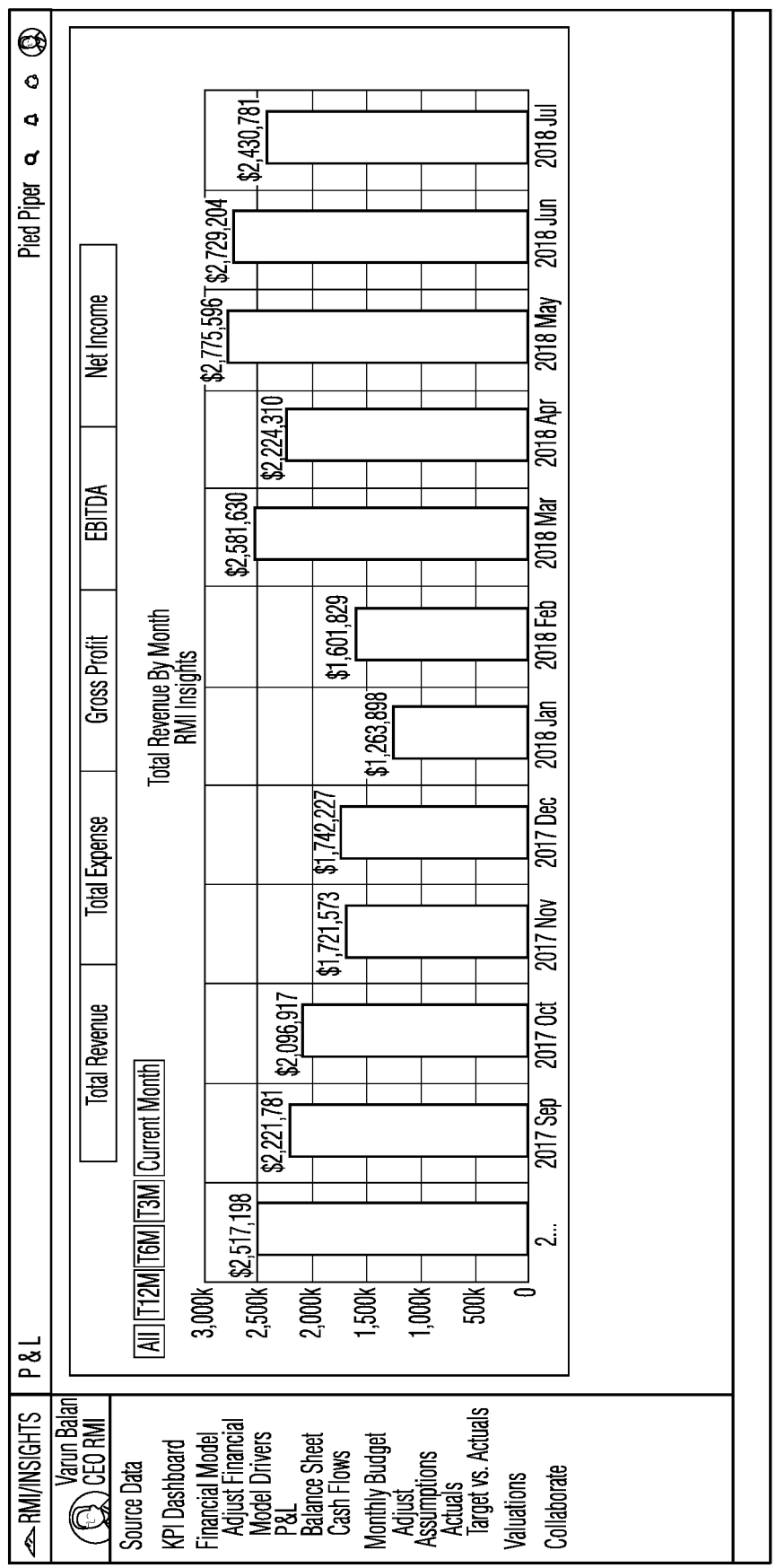
FIG. 3 is a screenshot of a Profit and Loss ("P&L") user interface according to an embodiment of the subject technology, according to example embodiments.
Figure 4:
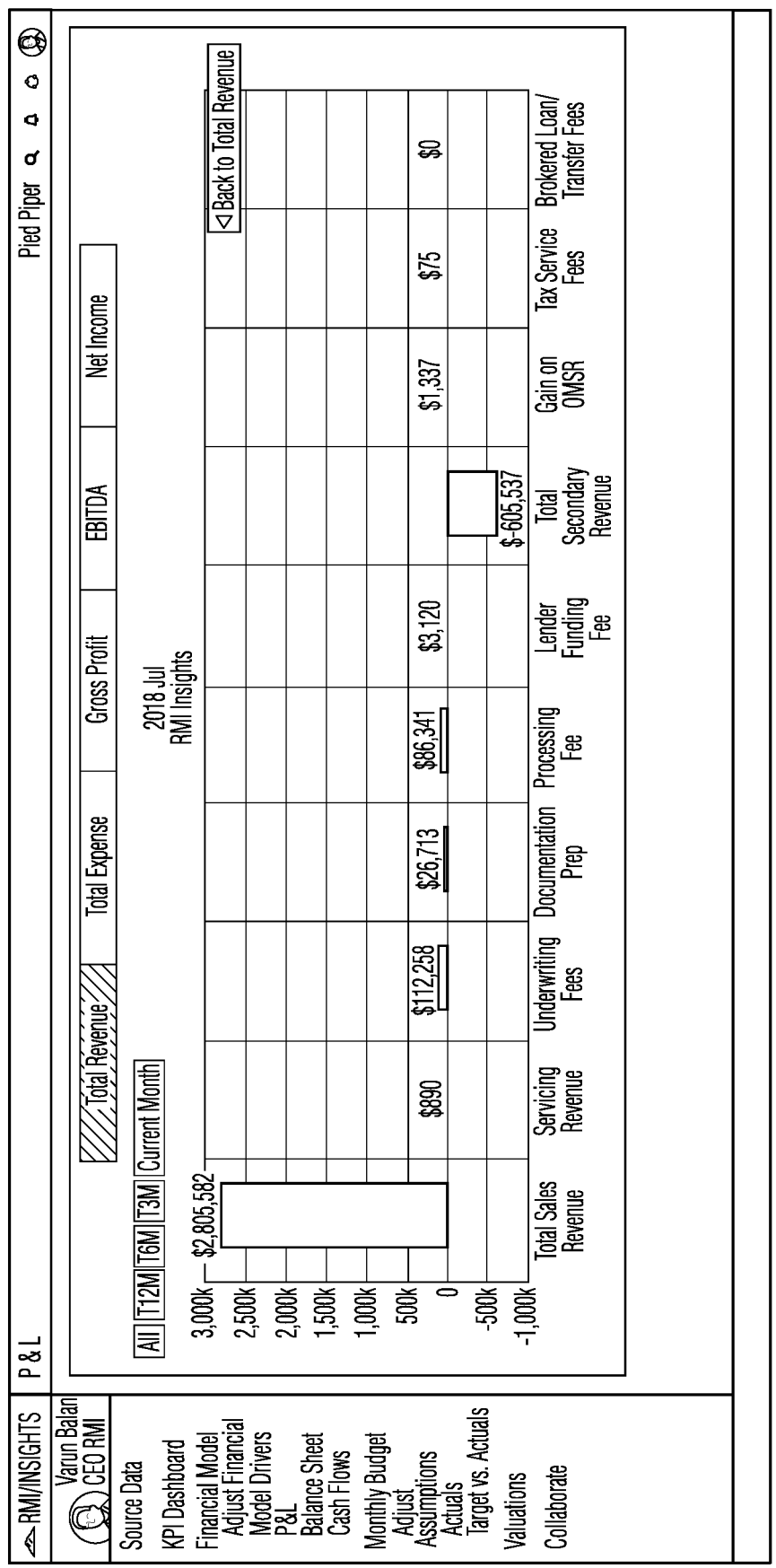
FIG. 4 is a screenshot of a detailed profit and loss user interface showing details of data from a selected month of the user interface of FIG. 3 according to an embodiment of the subject technology, according to example embodiments.

The data is displayed between two tabs entitled "Dashboard" and "Performance". The Dashboard depicts tables of varying Key Performance Indicators (KPI's) specific to a given company along with other global KPI's (see, e.g., FIG. 2). The tables include actual vs. target values (along with the corresponding variance) for each of these indicators for the current month as well as the year to date (see FIGS. 2 and 22). Some examples of said KPI's are Origination Volume, EBITDA, Accounts Receivable, Cost of Sales, Days Sales Outstanding, Labor Efficiency ratio, etc. This allows for easy visualizations of general company performance compared to projections (the process for arriving at these projections is detailed much further in what follows) in a variety of areas. Moving to the performance tab, performance is broken up into 3 sub-tabs: "Actuals", "Projections", and "Variance" (see FIG. 13, Block D). Within any of these 3 sub-tabs there is the further breakdown into the 3 major financial statements: P&L, Balance Sheet, and Cash Flows. The P&L tab is then broken down even further into:

Total revenue
    Includes all revenue line items
    Shows breakdown of different revenue streams
Cost of Revenues
    Includes all cost items before gross profit
    Shows breakdown of all cost of revenue line items
Gross Profit
    Shows breakdown of total revenues and cost of revenues
SG&A Expense
    Includes all expense line items before EBITDA
    Shows breakdown of all SG&A expense line items
EBITDA
    Shows breakdown of gross profit and SG&A expense
Depreciation & Amortization
EBIT
    Shows breakdown of EBITDA and depreciation and amortization
Interest Expense
    Shows breakdown of total debt outstanding, a calculated interest rate based on the interest expense/total debt outstanding
Income Before Taxes
    Shows 2 bars, 1 for EBIT and 1 for interest expense
Income Tax Expense
    Shows income tax expense and a calculated income tax rate equal to income tax expense/income before taxes
Net Income
    Shows all the line items mentioned above as bars Each of these categories can also be sorted into all the data, the last 12, 6 or 3 months, or the current month. The above is shown in FIGS. 3 and 4.

Figure 5:
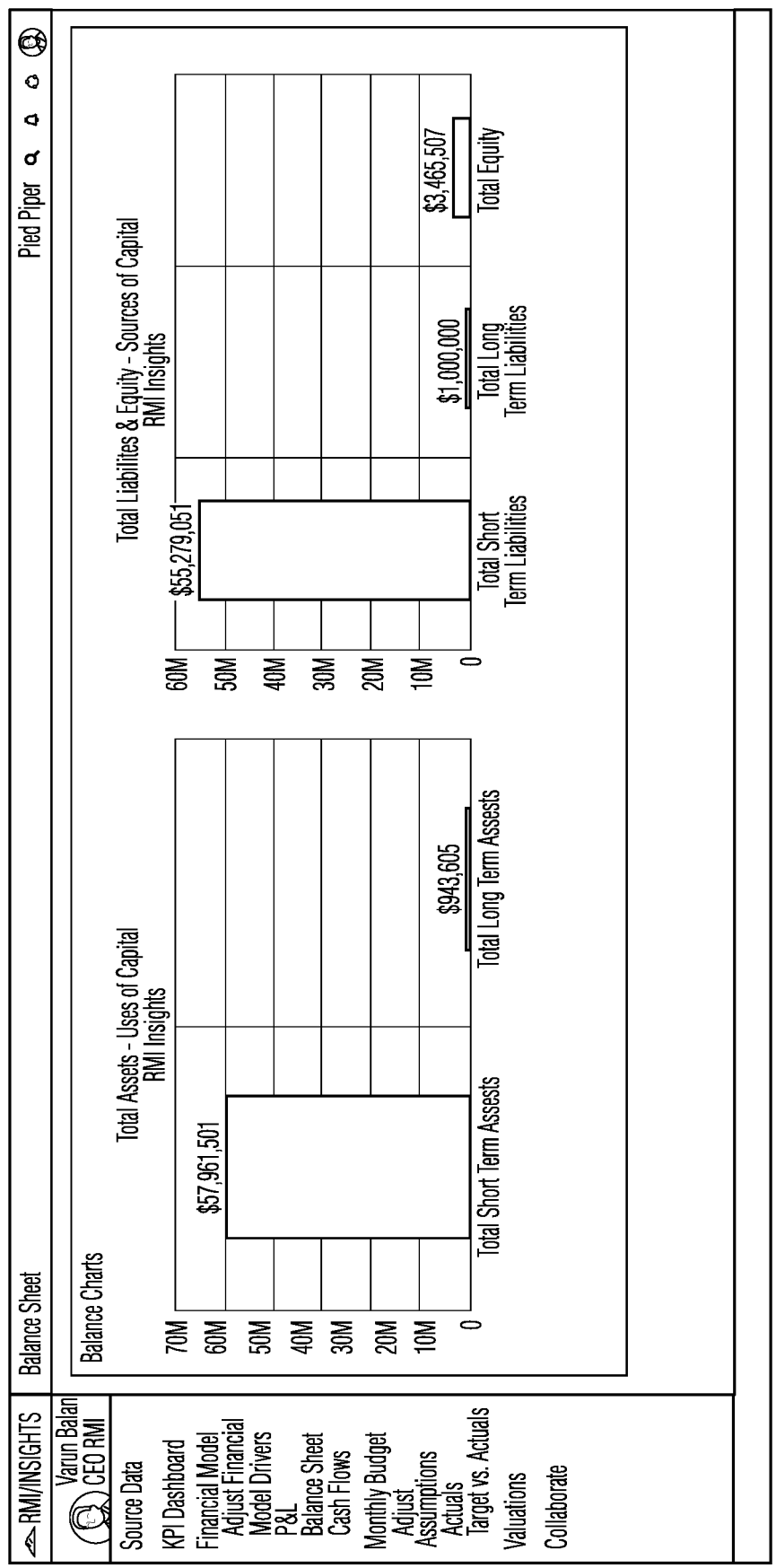
FIG. 5 is a screenshot of a Balance Sheet user interface according to an embodiment of the subject technology, according to example embodiments.
Figure 6:
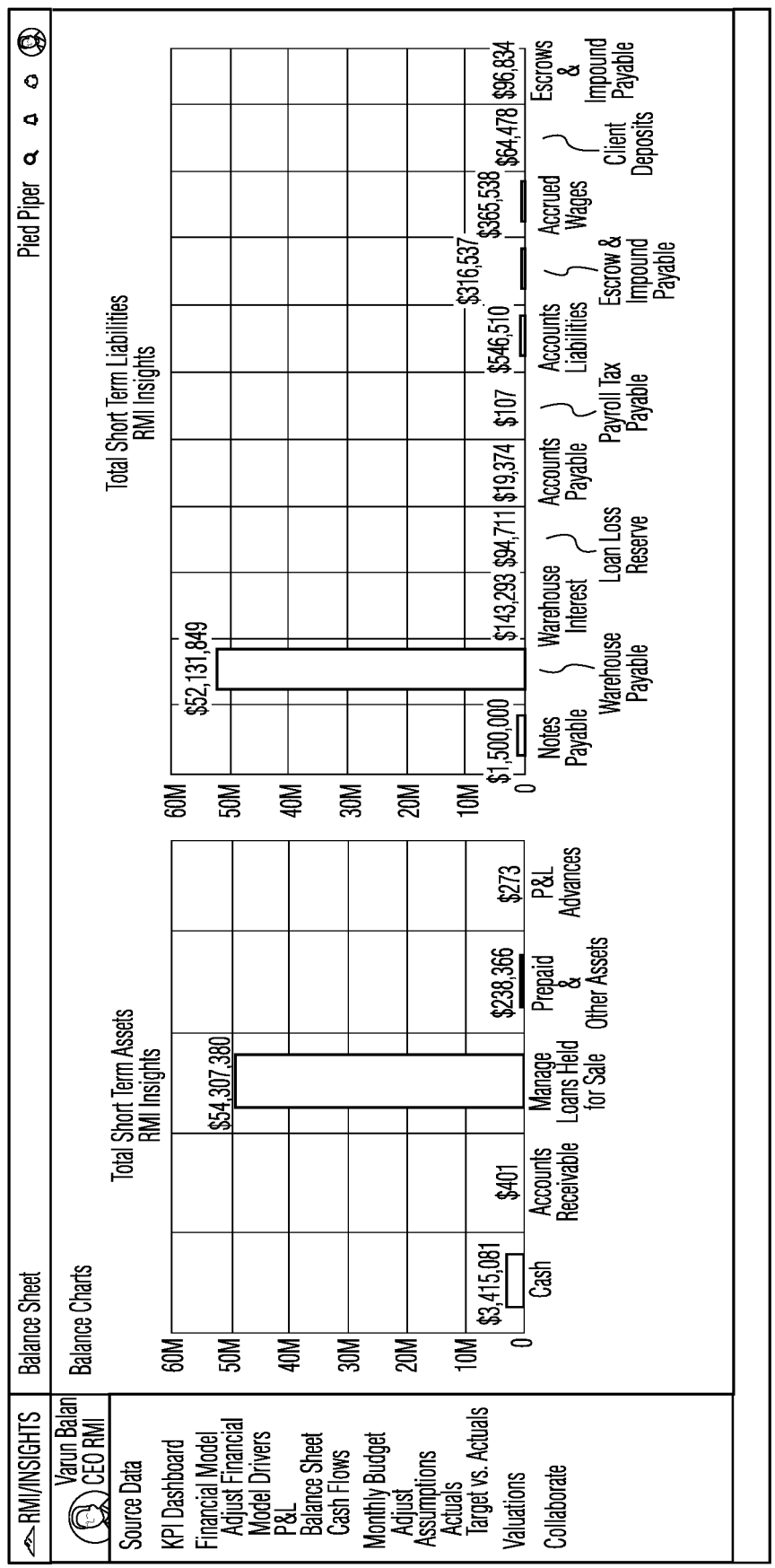
FIG. 6 is a screenshot of a detailed Balance user interface showing details of data from a selected month of the user interface of FIG. 5 according to an embodiment of the subject technology, according to example embodiments.
Figure 22:
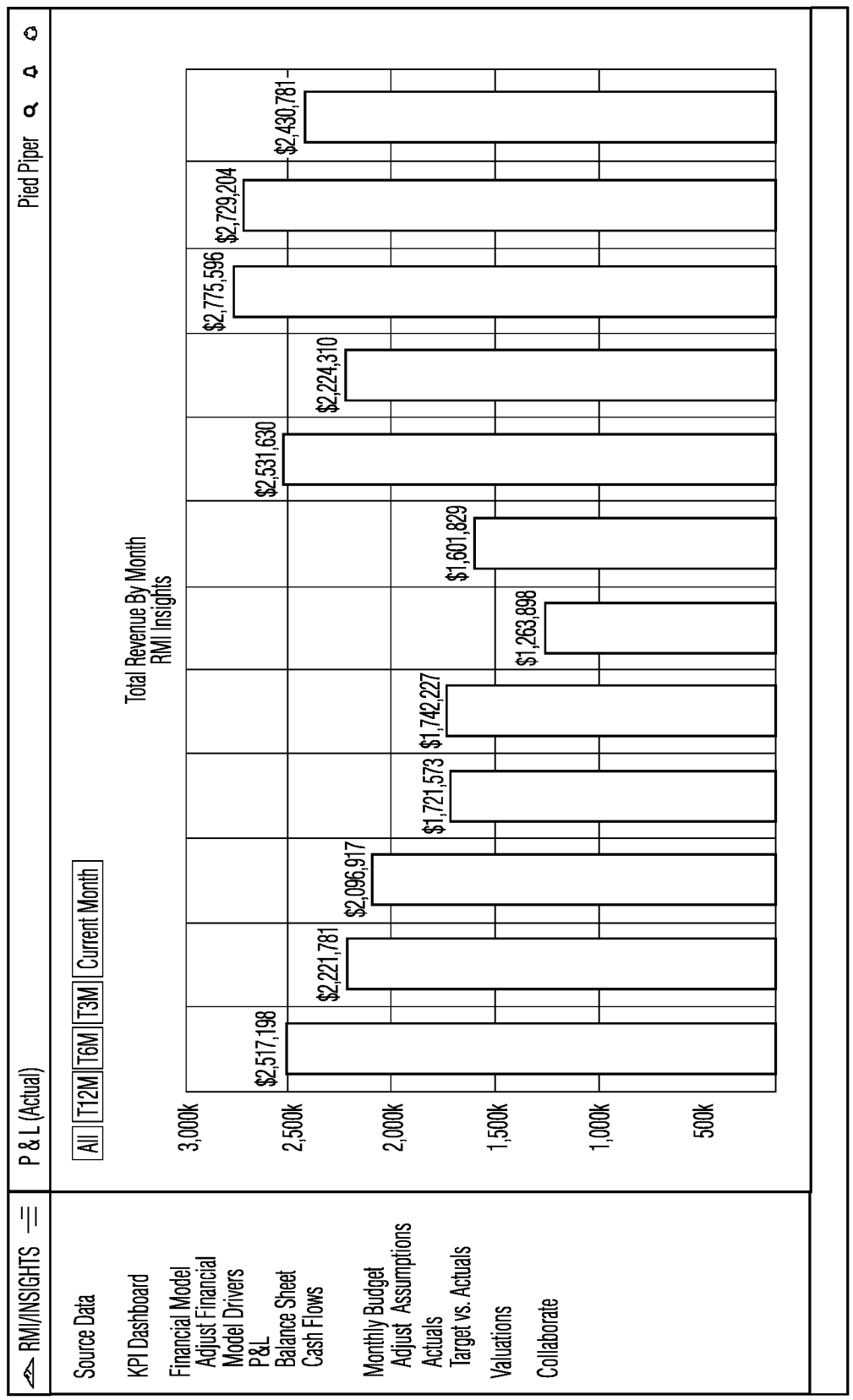
FIG. 22 is a screenshot of the interface highlighting one or more components of the system, according to example embodiments.

The balance sheet tab also incorporates the ability to further break down the data with a simple click (see FIGS. 5, 6, and 22). Initially the data is sorted into Total Assets—Uses of Capital, and Total Liabilities & Equity—Sources of Capital each of which is divided into the short and long term. From here a simple click will give a detailed breakdown of that specific data (i.e. short-term assets are broken up into Cash, Accounts Receivable, Mortgage Loans Held for Sale, Prepaid & Other Assets, etc.).

Finally, for cash flows the change in cash for each month is shown on the initial screen (note this can also be sorted to show all the data or simply the trailing 12, 6, 3 or current month). In addition, a simple click gives a drill down analysis of this data breaking up the change in cash into funds from operation, cash flow from operations, cash flow from investing, and cash flow from financing (see, e.g., FIGS. 7 and 8).

Once the actuals are imported the system can now make projections of each of the corresponding financial statements. (For a visual breakdown of this process refer to FIGS. 14, 15, 16 and 22). These projections are then visualized on their own in the "Projections" sub-tab of "Performance" and, also, side-by-side with the actuals in the "Variance" sub-tab.

The initial Income Statement Projection model process (see, e.g., FIG. 14) begins by analyzing the specific business models and cases represented by each of the respective clients—and then appropriating the correct outline to meet the appropriate needs. For instance, clients may request analyses of financial performance under varying assumptions about approach to sales, changes in marketing strategy, changes in employment, or other potential significant upcoming events that have major financial/performance implications (see, e.g., FIG. 14, Block B). After classifying by business types, the system will determine the key revenue drivers present in the model, specifically by taking respective line items on the income statement that exceed 20% of the total revenue items and then appropriately stripping them out as key drivers. The same methodology will then be applied to expense items (for most situations, all line items that constitute SG&A will also be included as expenses) only for 10% (see, e.g., FIG. 14, Block C). After understanding the key drivers for Expenses, Costs of Goods Sold, & Revenue, trends in historical data (or if no trends exist using a trailing 12-month average) are identified. The software will do this by testing varying regressions for different historical data (on the most recent year) and identifying the ideal trend and ensuring it surpasses given critical values for correlation. This process will also utilize machine learning in order to more accurately identify trends as the system gains exposure to more and more data (see, e.g., FIGS. 14, 21 and 22). At this point, Tax Spending/Credits are applied through an income tax analysis where the system will sum up the appropriate tax spends (depending on the corresponding company's provided net income balance based on historical numbers). After correctly assessing the amount of tax spending/credits (including NOLs in the case of the latter) the appropriate cost associated with taxes will be applied (see, e.g., FIG. 14, Block E). At this point, with all the previous analysis complete, the system will be able to use growth assumptions (compiled and applied based on the AI and Machine Learning capabilities) to ultimately produce a projected Income Statement (see, e.g., FIG. 14, Block F).

For example, the present system may use modern machine learning algorithms and AI techniques that are highly accurate, flexible, and self-learning. The system may use machine learning-based document classification and extraction techniques for analyzing company financial data from monthly/quarterly/annually published reports. The intelligent extraction engine may work dynamically across various document types. The system may use deep learning techniques like natural language processing and image classification to identify document types and extract relevant information with improved accuracy (e.g., 100% accuracy). The system may be deployed on a scalable and self-managed cloud platform running on Google Cloud.

In some embodiments, the system may apply machine learning approach and technical/economical analysis methods to predict future financial performance of a company. Predictions may be made using AI based approach by considering various factors like past performances, industry trends, market conditions, economy, GDP, and the like. The training set may include a vast number of historical financial data of various companies across multiple geographies and multiple industries. Past company performance data may be derived from authorized sources (e.g., Bloomberg and Yahoo Finance). In some embodiments, the training data may span across multiple companies from different industries with at least 10 years of consecutive filings with SEC.

In some embodiments, the system may use developed classification and Natural Language Processing (NLP) based extraction techniques for rationalization of key performance indicators like EBIT, EBITDA. Configuration of an application can provide investors with AI/ML based what-if analysis for various key factors for predicting future results that is backed by machine learning prediction results. Future financial predictions may be developed using Support Vector Machines (SVM) techniques and results validated through 10-Fold cross validation. The solution may be configured to self-learn in a recurring manner. In some embodiments, prediction results achieved is approximately 91% for future financial performance and 100% accuracy for text extraction from published financial reports. In some embodiments, the system may also be offered as a service to registered users in Software as a Service (SaaS) model.

Figure 15:
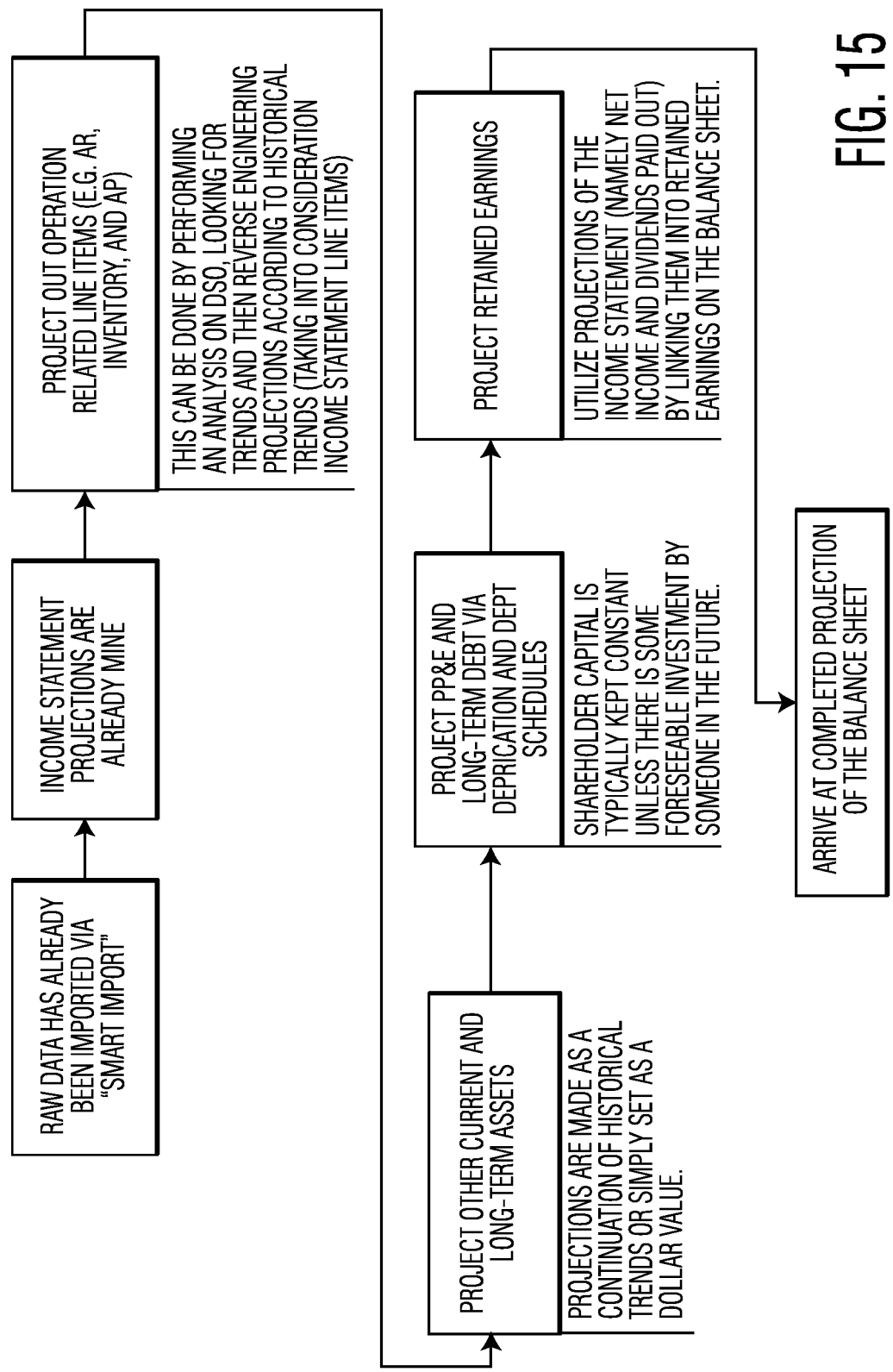
FIG. 15 is a flowchart describing the Balance Sheet projection process, according to example embodiments.

Projecting out the balance sheet is done in conjunction with the projection of the income statement (see, e.g., FIG. 15). In doing so assets, liabilities and equity (and all corresponding line items) must be projected out. Accounts receivable, inventory and accounts payable are all involved in operations and thus, these are forecasted by considering days sales outstanding, looking for historical trends and reverse engineering projections according to historical trends (the software will look at historical ratios of these line items to income statement line items like revenue and COGS based on the type of working capital) (see, e.g., FIG. 15, Block C). Working capital is defined as the capital of a business that used in its day-to-day trading operations, calculated as the current assets minus the current liabilities. Ratios can be calculated between working capital line items to income statement numbers (e.g. Accounts receivable/sales, Inventory/COGS, etc.). These historical ratios vary by business, industry, geography and can be used to forecast the future line items of the balance sheet (the software determines what line items based on models built for previous companies and matching line items to drive these ratios). Looking at the historical values, the system will determine key ratios to help drive the balance sheet items in the future. For other current and long-term assets, projections are made as a continuation of historical trends or simply set as a dollar value. Historical trends will again be identified by testing regressions and selecting based on the strength of correlation, along with utilizing machine learning (see, e.g., FIG. 15, Block D, FIG. 21 and FIG. 22). PP&E (property, plant and equipment) is projected using a depreciation schedule, and long-term debt using a debt schedule. For PP&E, based on the information we receive on the useful life and residual value, we can calculate the depreciation expense as (initial value−residual value)/useful life. Based on the detailed information on the debt structure (maturity, interest rate, etc.) we can construct a payment structure for the debt until it is paid off or refinanced. These capital structure assumptions will be based on previous models built and management disclosures on the future of the company. Typically, shareholder capital is kept constant, so it is simple to project unless there is some foreseeable investment by someone in the future (information of this for would need to come directly from the client) (see, e.g., FIG. 15, Block E). Finally, to project retained earnings, the projections of the income statement (namely net income and dividends paid out) are linked into retained earnings on the balance sheet (see, e.g., FIG. 15, Block F). Note that many balance sheet line items are directly tied to components of the income statement such as revenue. Thus, the income statement projections provide a helpful backdrop when considering how to project out a balance sheet (see, e.g., FIG. 15).

Finally, to link all the statements together, the Cash Flow Statement is used to reconcile the year over year changes in Balance Sheet items as well and cash flow from Income Statement items as well. There is no projection for the cash flow statement, it is the link to tie all three statements together to best illustrate a business' financial performance. Forecasted numbers for the cash flows statement are arrived at via the projections made for the Income Statement and Balance Sheet (see, e.g., FIG. 15). The Cash Flow Statement starts with Net Income from the income statement, then adds back non-cash expenses like depreciation from the Income statement. After that, working capital changes (year over year balance sheet changes of current assets and current liabilities) from the balance sheet show changes in cash from operations (e.g. if Accounts Receivable went up from $100 in 2015 to $150 in 2016, then there was $50 worth of net income reported that was not earned in cash). Long-term asset and long-term liability changes as well as capital expenditures show up on the cash flow from investing portion of the cash flow statement. These numbers pull from the balance sheet as well as the PP&E schedule. Lastly, any financing assumptions related to debt or equity issuance (from the debt schedule) will show up on the financing portion of the cash flow statement.

These projections will initially be 80% completed by the system and the final 20% will involve modifications made by client input/discussion and the RMI Insights team of experts. As time passes and more and more data are input to the system, eventually machine learning will be able to take over that final 20% of modifications used to improve the model to be as accurate as possible (see, e.g., FIGS. 21 and 22). To do so, considerations and modifications are implemented based on the industry, geography, revenue, and size of the company (see, e.g., FIGS. 21 and 22). Eventually, machine learning and AI will allow the system to generate models more accurate and refined than any human could ever create. Through continued use and collection of data, the accuracy of the system generated models will only increase.

In addition, the system also visualizes the projections (found via the means described above) alongside the visualizations of the actuals. This occurs in the "Variance" sub-tab of the "Performance" tab. This allows for a very easy visual comparison of how the company is performing versus how it could be performing. Projections are overlaid on the same charts as the actuals with the variances shown in green or red indicating a positive or negative difference between actuals and projections respectively. These visualizations of comparisons also support the click drill down functionality adding details to the data that makes up the variances between the actuals and projections.

The process of making the financial statements and visualizing them is not what makes this system powerful; it is the comparison of the actuals with the proprietary model that the system builds and provides individualized analyses based on those variances.

Figure 17:
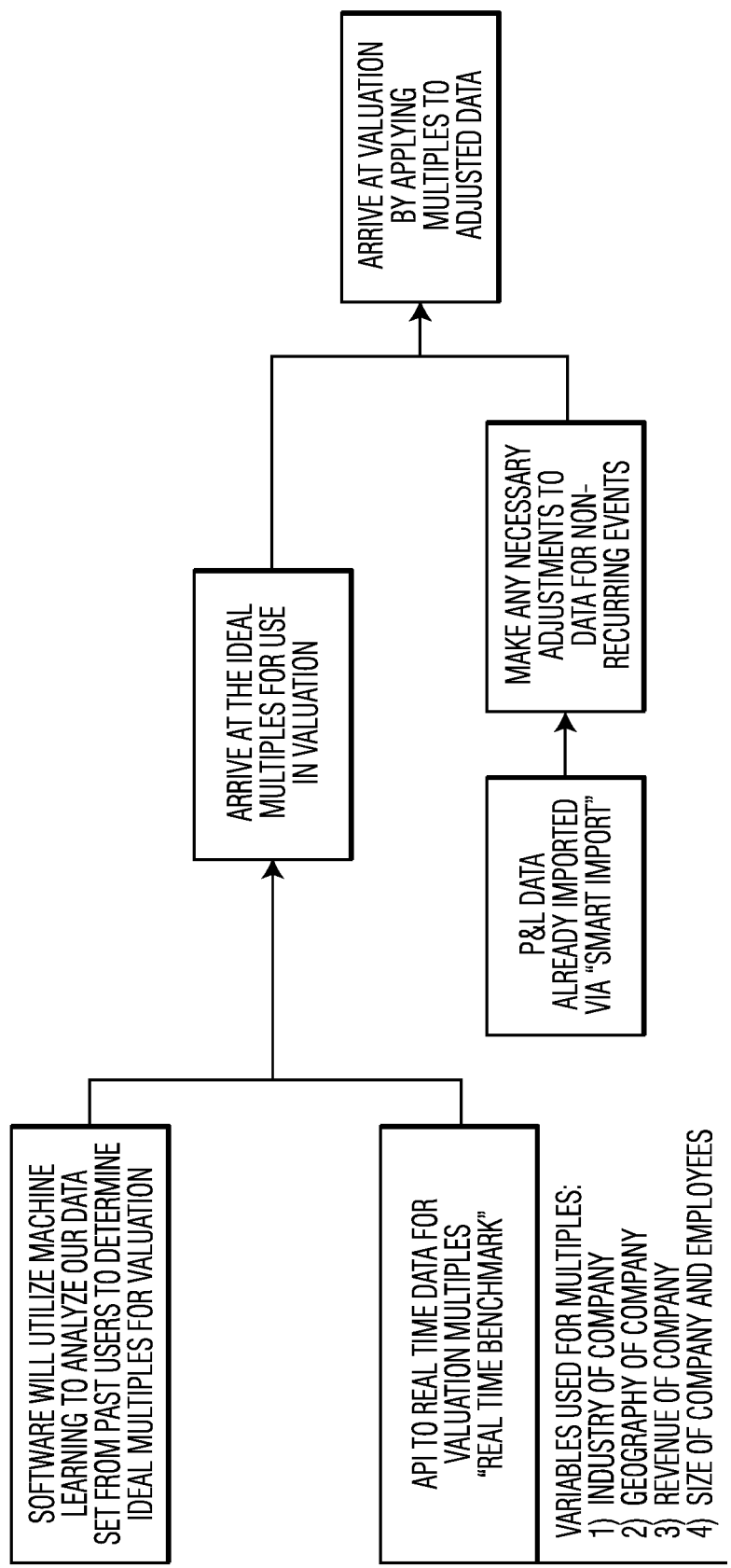
FIG. 17 is a flowchart outlining how the Revenue and EBITDA valuations are arrived at by the system, according to example embodiments.
Figure 18:
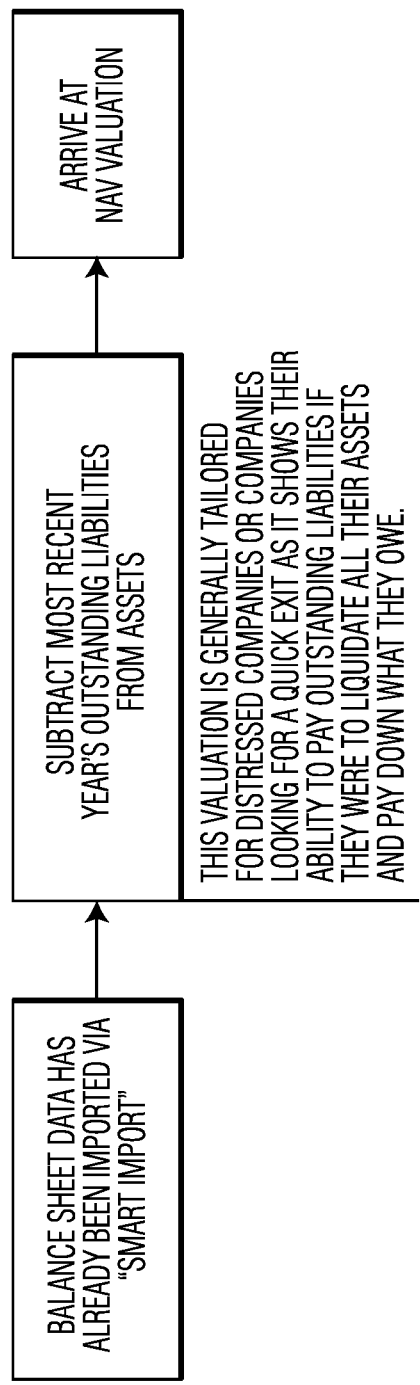
FIG. 18 is a flowchart outlining how the Net-Asset-Valuation is arrived at by the system, according to example embodiments.
Figure 19:
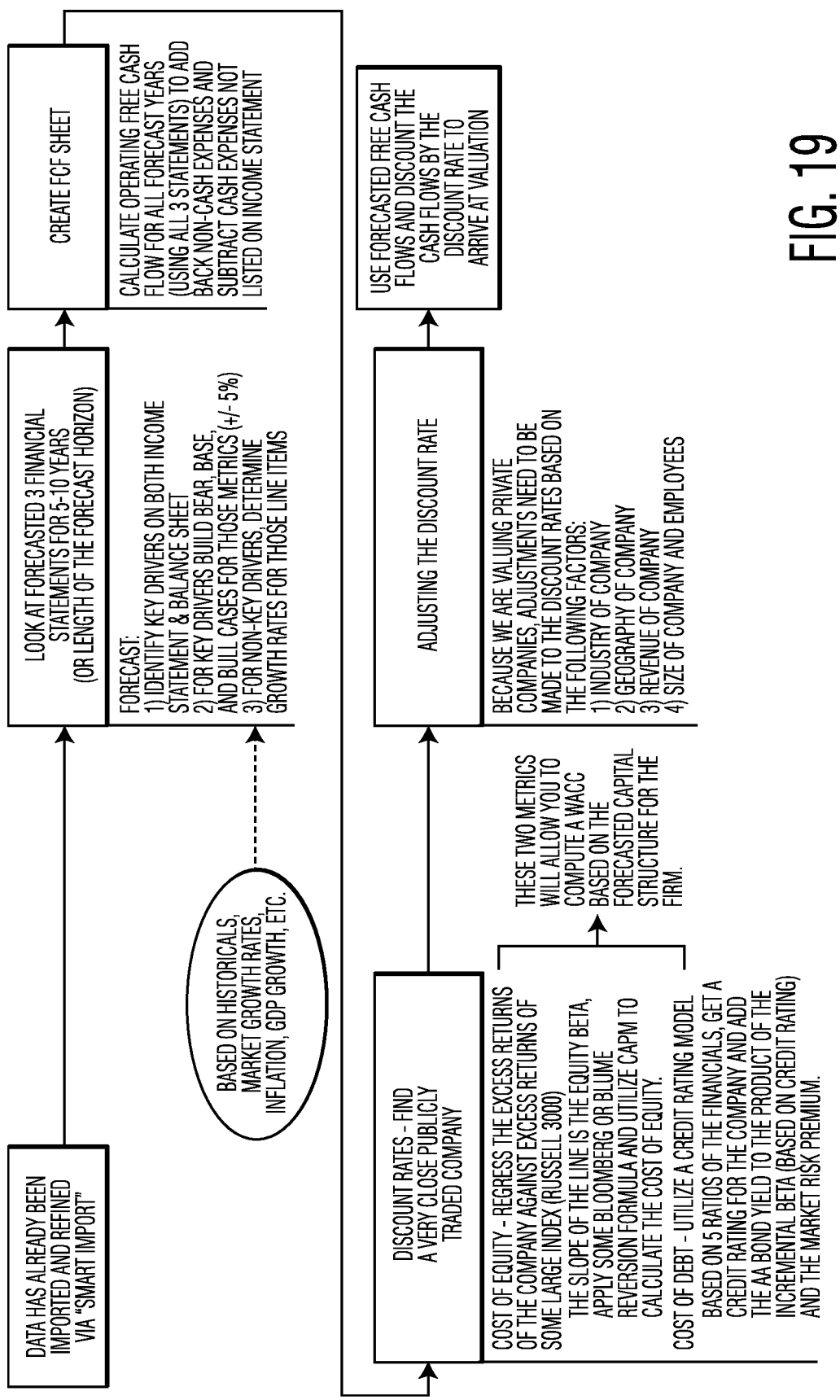
FIG. 19 is a flowchart outlining how the Discounted Cash Flows valuation is arrived at by the system, according to example embodiments.

In addition to analyzing and visualizing historical data and making comparisons with projections created via machine learning generated financial models, the system also has the functionality of generating valuations for a company utilizing varying valuation methods and each of the 3 financial statements to do so (see, e.g., FIGS. 17, 18, and 19).

The first method is a valuation based on revenue, EBITDA, and other Income Statement multiples (see, e.g., FIG. 17). The system will utilize an API to real-time data for valuation multiples (i.e. a "Real Time Benchmark"). The variables used for multiples are based on public companies with a very similar business model and a similar industry. After the right comparable company (or companies) is established, a risk factor based on the industry, geography, revenue, and size of the company is applied to the private company being valued (see, e.g., FIG. 17, Block B). Also, paired with this real time benchmark, the system will utilize machine learning to analyze continually growing set of financial data from our past users to determine the ideal multiples for the valuation (see, e.g., FIG. 17, Block A, FIG. 21, and FIG. 22). After the system has the ideal multiples to use for the valuation, the system takes the already imported and refined Income Statement data (acquired via "smart import") and makes any necessary adjustments to the data to account for any non-recurring or outlying events (see, e.g., FIG. 17, Block D and Block E). The adjustments made are for non-recurring events will be handled through pattern recognition from the AI and Machine Learning implementation (see, e.g., FIGS. 21 and 22). In other words, the system will be able to judge what is a non-recurring event on its own (although human intervention and adjustments will still be possible as needed based off input from the client and the RMI Insights team). After this has been completed, the determined multiples can be applied to the adjusted data to arrive at the valuation (see, e.g., FIG. 17).

The next is a Net-Asset-Valuation (see, e.g., FIG. 18). This valuation is based on the balance sheet. Specifically, the valuation is performed by taking the most recent year's assets and subtracting the outstanding liabilities (see, e.g., FIG. 18, Block B). This valuation is more tailored for distressed companies or companies looking for a quick exit because it illustrates the company's ability to pay its outstanding liabilities if it were to liquidate all its assets and pay down what it owes. Once again, the system will be able to utilize projections to analyze when a strategy based of a NAV may be the best based on the projections of the balance sheet items.

Finally, there is the Discounted Cash Flows valuation (see, e.g., FIG. 19). To arrive at this valuation the system starts by considering the company's financial data that has already been sorted and refined by the "smart import" function. On top of this the system utilizes the projections it has already made based on the machine learning generated financial model that was used to forecast out the 3 financial statements. The 3 financial statements are forecasted out 5-10 years (or the length of the forecast horizon) and this is done by identifying key drivers on the Income Statement, Balance Sheet, and Cash Flow Statement building out bear, base, and bull cases for those metrics (+/5%), and for non-key drivers determining growth rates based on historical data, market growth rates, inflation, GDP growth, etc. (see, e.g., FIG. 19, Block B). Once all this is done the system will create a Free Cash Flows sheet for all the forecast years (utilizing all 3 financial statements) to add back non-cash expenses and subtract cash expenses not listed on income statement to arrive at the Free Cash Flow generated for that year (see, e.g., FIG. 19, Block C). Next, the system will determine the appropriate discount rates. It will do so by finding a very closely comparable publicly traded company. To select the company the system will sift through comparable companies that are publicly traded on the NYSE, NASDAQ, LSE, HKG, TSX, SENSEX, and DAX stock exchanges (pulling the information through a third-party API i.e. CB Insights, FactSet, CapIQ, SNL Financial, and Bloomberg) and identify companies operating in the same industry, with similar financial metrics, and similar geography. When considering cost of equity, the system will regress the excess returns of the company against excess returns of a large index like the Russell 3000 (this information will also be pulled from a third-party API as above) because other indices do not best reflect the market (the S&P500 only includes large cap stocks and the NASDAQ only includes industry specific stocks). The slope of this line is the equity beta, to which we apply a reversion formula (Bloomberg ($0.33+0.67*beta$) or Blume ($\frac{2}{3}*beta+\frac{1}{3}$)) to get the mean reversion adjusted beta and utilize CAPM to calculate the cost of equity. For cost of debt, the system will utilize a commonly used credit rating model (created by Robert Holthausen and Mark Zmijewski, two experts in the field of valuation) based on 5 key ratios from the financials

[EBIT/(Average Total Debt+SE), Interest/EBITDA, Total Debt/(CFO−Capex), Total Debt/(total debt+SE), Capex/EBITDA]. It then will get a credit rating for the company and add the AA bond yield to the product of the incremental beta (based on the credit rating) and the market risk premium. It then computes a WACC (weighted average cost of capital) based on the forecasted capital structure of the firm by utilizing 2 metrics described above as well as the capital structure of the firm being valued. The WACC is calculated by taking the value of equity divided by the value of the firm and multiplying it by the cost of equity an adding the value of debt divided by the value of the firm and multiplying it by the cost of debt. From here, since we are valuing private companies, adjustments are made to the discount rate based on the industry, geography, revenue, and size of the company as well as the general increased risk of the private company compared to the public comparables (see, e.g., FIG. 19, Block E). Now, finally, the forecasted free cash flows are discounted by the discount rate to arrive at the present value of those cash flows and therefore a valuation for the firm (see, e.g., FIG. 19, Block F).

All three of the above valuations are clearly visualized in the "Valuations" tab in the system platform. They will be shown on a "football field" graphical display showing all the valuation ranges conducted by the system side-by-side. This chart also supports a drill down functionality which gives a user insights on the statistical breakdown of the data and how the valuations were arrived at.

Also, the system platform adds the functionality of an executive messenger tab. This allows executives, investors, and others to be in communication about their businesses of interest and their financial performance. This functionality facilitates a fluid and consistent share of information to all parties invested in a business while also servicing as a great professional networking tool.

By allowing Executives of a company to use embodiments of the system which pull information from the company's Enterprise Resource Planning system, the system will construct a proprietary projections model for the company, compare the company's projected financial and operational metrics to the company's actual financial and operational metrics, and most importantly provide valuations of the company based on the company's actual and projected financial and operational data. As will be appreciated, this provides an improvement for Executives and other Investment Managers who previously relied on tools not directly meant for Financial Planning & Analysis, (for example, Microsoft® Excel®).

Figure 1:
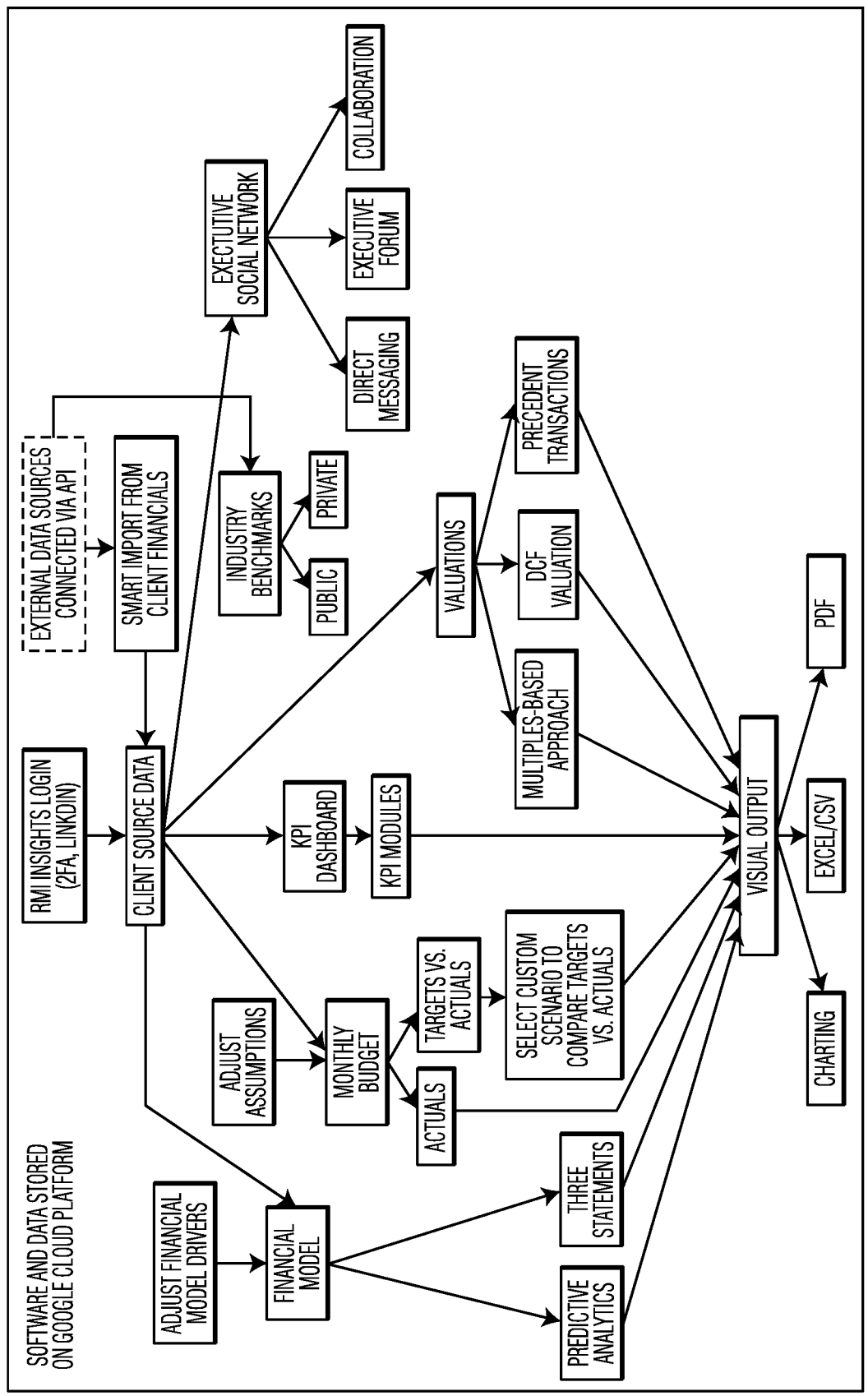
FIG. 1 is a flowchart of a method of automatically generating data-driven interactive visualizations of financial data according to an embodiment of the subject technology, according to example embodiments.

Referring now to FIG. 1, FIG. 1 depicts the general roadmap of the software, starting from a client login page that can be completed using either 2-factor authentication or LinkedIn in order to ensure security and privacy. Clients are then greeted with a homepage that acts a dashboard, allowing clients to then access the features of the software. The software also used external data sources in order to integrate real time data in order to find various valuation multiples in order to generate more accurate financial visualizations. An API is essentially a "messenger" that carries the software's request for external data to the external data source, and then the API also acts as the delivery method for the external data back to the software. Such external data is very important for the financial projections and visualizations in relating clients to similar organizations and industries. For example, each client's beta is found by comparing the client to other companies of similar size with similar value chain activities and capital structures. A firm's beta is its correlation to the market risk, meaning a firm with a beta of 1 is perfectly correlated to the market, while a beta of 0 is essentially a risk free asset since its returns have nothing to do with the risk of the market. This beta will be an approximation based on various metrics. Beta is used in order to calculate the cost of capital for the client. Clients also have the option to message with other users in order to share insights and knowledge. The 1-on-1 messaging function utilizes a chat function in order to make communication between clients as simple as possible. The RMI Insights software database uses the file upload tool and the "smart import" function in order to allow clients to upload their financials in a variety of file formats. The file repository allows the software to use machine learning in order to improve visualization and generalizations for the future. The information is stored on Amazon Web Service's Simple Storage Service, also known as S3. The exact method of the smart import function is described in greater detail in FIG. 9. All of this financial information along with key KPIs and external data sources are used to generate valuations using three different approaches: multiples based approach, net asset valuation, and discounted cash flows valuation, which are described in greater detail in FIGS. 17, 18, and 19. All of these aspects of the software, including chat functionality, file upload, visualizations, user account configuration, key KPIs, and valuations all allow the software to generate data-driven interactive visualizations.

In some embodiments, the system maps all financial and operational data of an organization, business or business unit and provides Executives and Investment Managers with a 360° view of the entities that they run and manage. The steps include retrieving an entity's financial data from a database of financial records. The data from the database may be initially inputted in a variety of ways including CSV, PDF or direct pull from the Company's ERP system in order to accurately compare the actual financial and operational data of the Company to the proprietary, accurate projected performance of the Company in both a 'standard' report through the invention's proprietary, data-science driven visualizations.

The valuation data may be displayed within an electronic platform (which may be online in some embodiments), with features in some embodiments as shown in the left and central part of the flowchart. In an exemplary embodiment, the platform includes a feature which allows the user to build proprietary projections based on imputed data based and proprietary, mathematical and statistical operations. In addition, complex, interrelated datasets may be produced by a user on demand based on various operational data provided by the Company's ERP, Sales, HR or other system. As will be appreciated, through the embodiments described, content is automatically altered that is initially perceptible only through numbers on non-interactive 'standard' reports to content that is perceptible visually through visually interactive charts, reports and diagrams. An exemplary embodiment generates interactive valuations displayed on a user's computing device. The data content is used to produce proprietary projections. Examples of data produced by the system can be seen in FIGS. 2-4, which are screenshots of various user interface displays of the system and data generated by the steps described above. This is performed by taking all of the company's financial and operational data and reducing it to component parts, then reproducing and performing operations upon key components of those parts through mathematical and statistical operations and comparing it to proprietary projections. The initially perceptible numbers—or data—is provided by the Company. The projections are produced by proprietary mathematical and statistical operations being performed on the Company-provided data. In some embodiments, a general computer is transformed into a special-purpose computer for this activity, taking input from the Company and allowing it to interact with the system. The user perceives the content visually through the computer's color monitor's waveform depiction of the content. The system allows users to visually identify, categorize, synthesize, and solve problems collaboratively with one another and other experts.

FIG. 2 is a screenshot of a dashboard user interface according to an embodiment of the subject technology, according to example embodiments. The dashboard depicts tables of different KPIs, which are key performance indicators. These indicators are quantifiable measures that a company can use to track performance over time. Different industries and companies can use different KPIs. On the dashboard, the KPI tables show actual vs target values along with corresponding variances. Some examples of KPIs include revenue, expense, EBITDA, etc. The dashboard also shows global KPIs that almost all companies use to track performance over time, and these include cash, accounts receivable, accounts payable, cost of sales, etc. These tables like the individual KPIs above also track targets vs actuals along with corresponding variances. The dashboard provides a convenient home screen that clients can use to get a big picture view of how their financials are doing over a period of time. From the dashboard, users can also access the performance tab, which is explained in greater detail in FIGS. 3-8. The dashboard also allows access to the file upload "documents" tab which makes use of the "smart import" function, which recognizes various files such as CSV, Word, Excel, etc. and extracts various line-items by recognizing certain keywords such as "revenue," "expense," etc. The "smart import" function then extracts the corresponding numerical data to the line items, and this data serves as the raw data used by the software to generate valuations, models, and visualizations. The messaging tab contains chat functionality that allows clients to chat with other users to share ideas and visualizations. The My Page tab allows user to view a general overview of their own company, including contact information, location, and a brief blurb about the company, as this profile is also how other users view the client. The Company tab under My Page also shows the registered employees and their respective profiles and contact information. The other tab under My Page is the profile, where individual users can see their profiles. This differs from Company in that each individual user has their own profile outside of that of the whole company. Under this Profile tab, users can view their position within the company, site visit count, last IP, last time they opened the website, as well as the IP and time they opened the website the time before last. IP is an address used to identify computers within the world-wide web. Last IP essentially shows the last computer that that user's login credentials were used on to access the software. Users can also view their account activity under their profile, which shows the activity, a description of that activity, the IP address of the computer that conducted the activity, and the exact time the action was executed.

FIG. 3 is a screenshot of a Profit and Loss ("P&L") user interface, according to example embodiments. Specifically it shows the charting of revenue of the last 12 months for the company in bar graph form. The charting shows the month and year at the base of the bar, and the relevant metric at the top of the bar. The profit loss user interface is the visualization of the information gathered using the smart import function. Under the actuals tab, the profit loss user interface represents the aggregation of revenue and cost-related line items coming from the client's file upload to the smart import function. The projections visualization of the profit and loss interface represents the projections made by the software, which is described in detail in FIG. 14. The variance tab section of the profit and loss interface shows the difference, or variation, between the budgeted costs and revenues of a period and the actual costs and revenues of a period. Under actuals, projections, and variance, the profit and loss interface includes tabs across the tabs relating to all the sources of revenues and costs as well as other relevant metrics, including sales revenue, cost of revenues, SG&A expense, EBITDA, depreciation and amortization expense, EBIT, interest expense, income before taxes, income tax expense, and net income. Total revenue represents all of the earnings by the company in a specific month. Cost of revenues includes all the direct costs of acquiring those revenues. Gross profit simply is total revenues less the cost of revenues. SG&A expenses are also known as selling, general, and administrative expenses, and these expenses do not directly relate to production. These can include for example, accounting, legal, and promotional expenses. EBITDA is an abbreviation for earnings before interest, tax, depreciation, and amortization, and this metric is useful in measuring a company's operational performance because it measures earnings without factoring in financing decisions. Depreciation and amortization expenses describe costs incurred because of the gradual deterioration of value over time of tangible and intangible assets respectively. EBIT is an abbreviation for earnings before interest and taxes and is a measure for a firm's performance including both operating and non-operating expenses. Interest expense is another non-operating expense that includes costs incurred because of payables on any borrowings including bonds, loans, or lines of credit. Income before taxes is simply a measure of a firm's performance including operating and non-operating costs as well as interest expenses. Income tax expense is the costs incurred because of government taxes on its gains due to profit. Net income is essentially what the firm walks away with after all expenses and taxes. All of these metrics are important for measuring firm performance and are therefore represented in the P&L tabs under actuals, projections, and variance.

FIG. 4 is a screenshot of a detailed profit and loss user interface showing details of data from a selected month of the user interface of FIG. 3, according to example embodiments. Specifically, it shows the sub charting of total revenue for a specific month within the last 12 months for the company in bar graph form. The different bar graphs represent the different sources of revenue for the company for a specific month. The same tabs represented in FIG. 3, which span revenues and expenses, both operating and non-operating, are also represented in the month-specific visualizations. Both the yearly and monthly tabs also include options for T12, T6, and T3 which mean trailing 12 months, trailing 6 months, and trailing 3 months respectively, which means the past number of months. For example, the visualization for T3M represents the aggregated data under that specific tab for a period of the past 3 months.

FIG. 5 is a screenshot of a Balance Sheet user interface, according to example embodiments. Specifically, it shows the charting of the balance sheet with total assets being broken down into both short term and long term assets and with liabilities and equity being broken down into total short term and long term liabilities and total equity. Assets should equal liabilities+equity. As the user can see, the assets bar, shown in a light blue, is always the exact same height as the sum of the liabilities bar (shown in dark gray) and the equities bar (shown in light green). The breakdown of each bar into specific assets, liabilities, and equities is described in more detail in FIG. 6.

FIG. 6 is a screenshot of a detailed Balance user interface showing details of data from a selected month of the user interface of FIG. 5, according to example embodiments. Specifically, it shows the sub-charting of the balance sheet with the individual line items of both short term assets and short term liabilities. When a user clicks on the bars from a specific month from FIG. 5, each category is broken down into subcategories. For example, assets is broken down into a firm's current short-term and long-term assets for a specific month. Short-term assets are generally assets that can be exchanged for cash or used to generate cash flows within the next year, while long-term assets have expected payoffs coming in more than a year. Short-term assets is then broken down into cash and cash equivalents, and equivalents represent investment securities that are highly liquid, meaning they can easily be converted into cash and have high credit quality. Accounts receivable is an account for money owed to a firm by external entities that are expected to be paid within the year. Prepaid expenses are expenses that a firm has paid ahead of time for benefits that have yet to be received. All other short-term assets are grouped into the bar labeled "Other Short-Term Assets." Likewise, the assets bar's other section is long term assets, which is also further broken down into various subsections. Property, plant, & equipment is an account of physical holdings of the company that are vital to business operations but cannot easily be converted into cash. Goodwill and intangibles are an account of assets that are not physical holdings. Goodwill is an intangible asset that is a result of one company purchasing another, and the value that the acquirer places on the target above the actual value of that target's holdings are accounted for as goodwill. Other intangibles cover items such as customer relations and brand name that are vital for business operations but cannot have a numerical value assigned to them. Other long-term assets are specific to each client, and any remaining fall under "Other Long-Term Assets." As Assets always equals the sum of Liabilities and Equities, these two bars are also broken down into smaller components. Clicking on either of these two bars shows the breakdown of liabilities and equities at a specific date. Liabilities is broken down into short-term and long-term liabilities, and short-term liabilities is further broken down into short-term debt, accounts payable, accrued expenses, and interest payable. Short-term debt is an account that includes any debt that must be paid by the company within the next year. Accounts payable represents all money owed by a business to its suppliers or creditors. Accrued expenses are services or products the company has already received but has not yet paid for. Interest payable is an account that reports incurred interest that has not yet been paid. All other short-term liabilities are listed under the account "Other Short-Term Liabilities." Long-term liabilities is broken down into long-term debt, term loans, capital lease obligations, and deferred income tax. Long-term debt is any debt that the company must pay back in a period longer than one year. A term loan is a loan that requires regular payment over the course of years usually. Capital lease obligations are payments over a period of time of both interest and principal obligations for lease of capital, which is generally equipment, property, office space, etc. Regardless of whether leases are capitalized or operating, both obligations fall under this account. Deferred income tax is the difference between taxes as applied using tax laws vs. an individual company's accounting methods. Deferred income tax reconciles this difference. Equity is broken down into additional paid-in-capital, retained earnings, and investor equity. Additional PIC is the total value of shares excess of the par-value of a stock price. Par value is usually an arbitrary, small price that is not related to the actual market price of the stock. The aggregate of excess of the market price over the par value is additional PIC. Retained earnings is equal to net income less any dividends paid to investors. This money can then be reinvested within the company to expand operations or pay off liabilities. Investor equity is the ownership in the company that outside investors have, and it is also an account that shows how much of the company is financed by investors.

Figure 7:
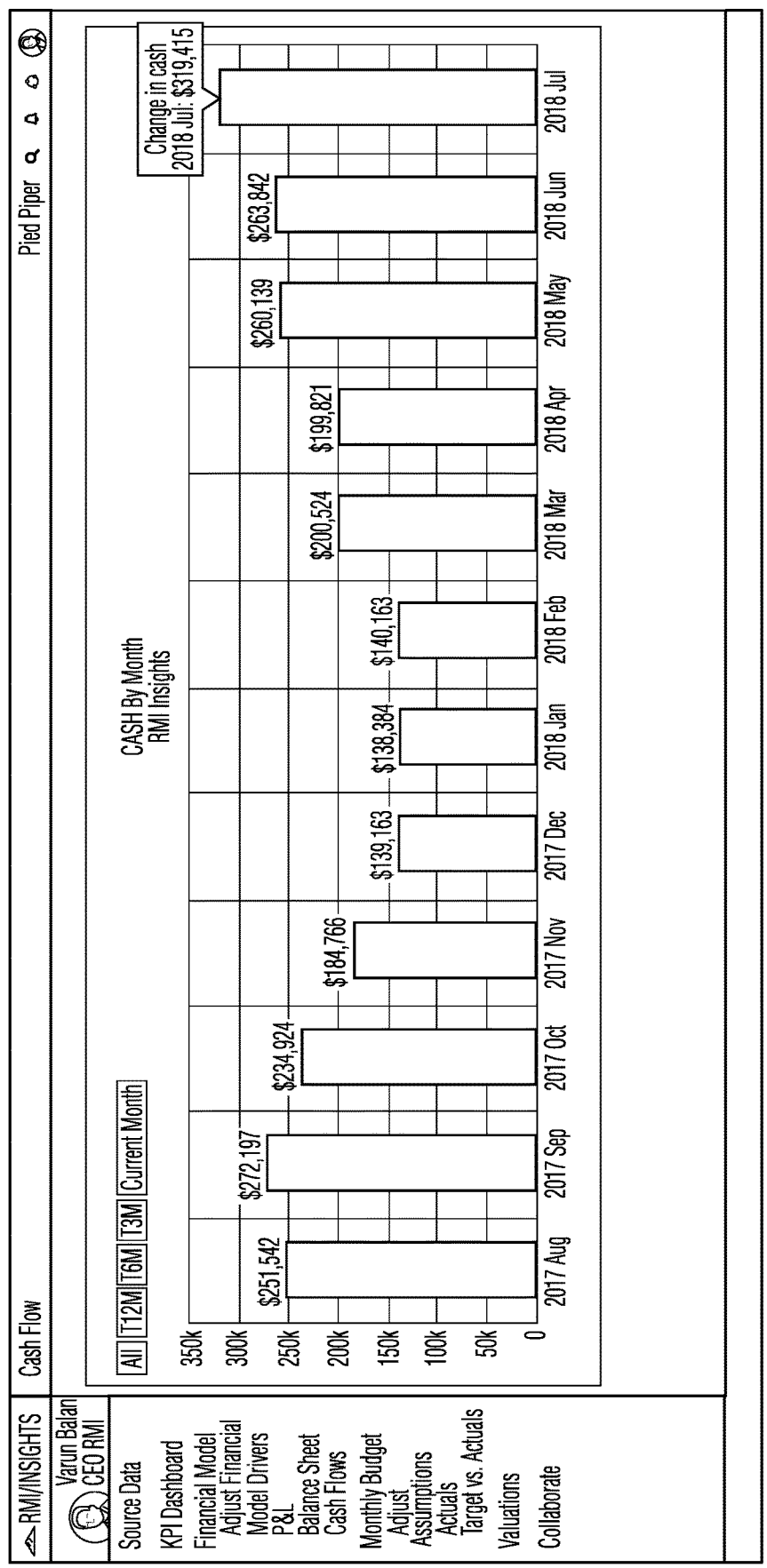
FIG. 7 is a screenshot of a Cash Flows user interface according to an embodiment of the subject technology, according to example embodiments.

FIG. 7 is a screenshot of a Cash Flows user interface, according to example embodiments. Specifically, it shows the charting of the change in cash number for each month from the last 12 months. At the base of each bar is the month and year and above each month is the change in cash balance for that month. Cash flow user interfaces are present under actuals, projections, and variance, and they all show the company's cash flows for those specific visualizations. Cash flow is the aggregation of all cash and cash-equivalents flowing into and out of a business. It is important to note that cash flows only cover transactions that involve cash. For example, purchases made on account are not a cash flow. Cash flows are generally split up into three categories: operating, investing, and financing. Clicking on any one month's aggregate cash flows breaks down into the three different categories of cash flows, which is discussed in greater detail in FIG. 8.

Figure 8:
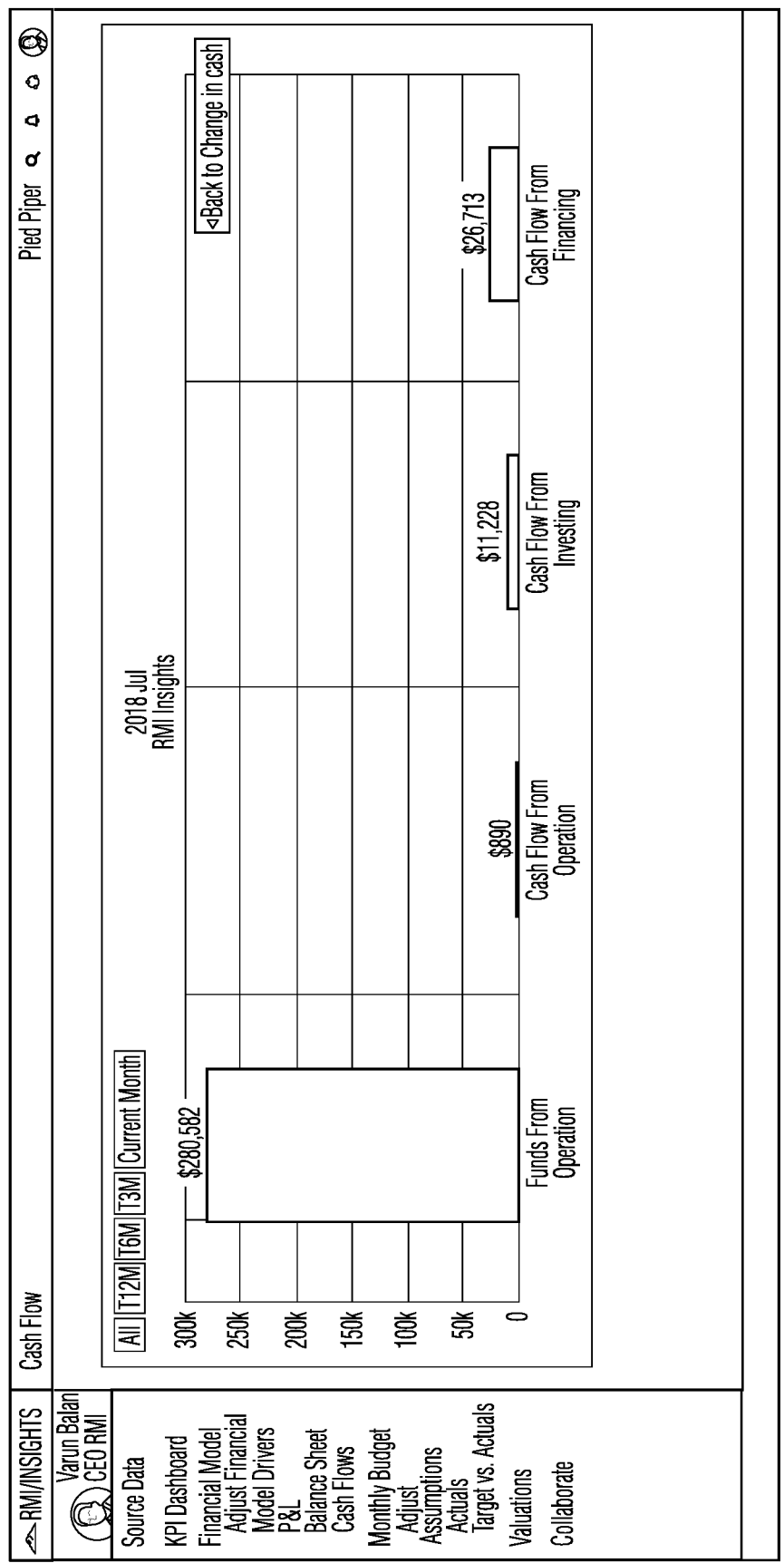
FIG. 8 is a screenshot of a detailed Cash Flows user interface showing details of data from a selected month of the user interface illustrated in FIG. 7, according to example embodiments.

FIG. 8 is a screenshot of a detailed Cash Flows user interface showing details of data from a selected month of the user interface of FIG. 7, according to example embodiments. Aggregate cash flow by month is broken down into operating, investing, and financing. Funds from operations is also shown as a proxy for the cash flow generated from the operations of the firm. Operating cash flows include cash flows that relate directly to a company's day-to-day operations. Investing cash flows encompass cash flows that relate to capital assets such as property, plant, and equipment. Financing cash flows encompass cash flows that relate to external activities that a company performs in order to raise capital, and this generally includes actions such as repaying investors, issuing stock, and performing actions on loans. FIG. 7 shows the aggregate cash flows, which is the net of operating, investing, and financing, for each month. There are also tabs at the top of the screen allowing users to view T12M, T6M, T3M, and current month. T3M for example, means trailing three months, which represents the aggregate cash flow for the company for the past three months. By clicking on a specific month's aggregate cash flow bar, the user can then view visualizations of operating, investing, and financing cash flows for each specific month. Each cash flow is then further broken down into different line items. For example, investing cash flow is broken down into capital expenditures and purchases of intangibles. Financing cash flows are broken down into different forms of debt and liability financing, as well as capital raised from investors as a cash inflow. Operating cash flows work differently from investing and financing because the software, and most companies in the US, use the indirect method of reporting cash flows from operations. The indirect method uses the net income as the starting point for operating cash flows. Because net income is calculated using accrual accounting and not cash accounting, non-cash expenses must be added back to net income, and non-cash gains must be subtracted from net income to arrive at the cash flow from operations.

The software presents net income as the first bar in the breakdown of operating cash flows and then reverses the signs for non-cash expenses and gains. For example, depreciation expense is presented as a positive figure.

FIG. 9 is a flowchart outlining the "Smart Import" function utilized to extract and refine user input financial, according to example embodiments. Specifically, the figure shows the step by step process of the data implementation. The user starts by submitting their financial information in certain acceptable file form as shown in FIG. 9, Block A. The software is able to accept many common file types, such as PDF, CSV, and Excel among others. FIG. 9, Block B shows how the software is able to use a company's existing files to begin to extract data and use it for proprietary visualizations. Sifting through a client's financials, the software searches for keywords and line items such as "revenue" and "operating expenses." Over time, the software uses machine learning along with an ever-growing bank of information from various clients in order to expand its "vocabulary," allowing it to recognize more specific line items. For example, instead of just recognizing "expenses," it can begin to recognize expenses specific to a specific industry. As the system gains more and more experience and information, it will be able to recognize more and more varying line items across differently reported financial statements. FIG. 9, Block C shows how data is extracted from a client's financials. After the software uses machine learning to recognize certain line items, it extracts the corresponding numerical values for each line item. FIG. 9, Block D shows that the system then takes the corresponding extracted data and organizes all of the compiled data into a preformatted spreadsheet designed specifically for the system. The preformatted spreadsheet is used for all clients as a standard so that the system can easily make visualizations and calculations off of an already formatted spreadsheet. FIG. 9, Block E illustrates the completion of the spreadsheet. Essentially, the data has been extracted from a client's existing financials and reformatted into a standardized, easy to understand format that is also ready to be used by the system to make insights and visualizations. FIG. 9, Block F demonstrates that the RMI Financials Spreadsheet is then made available to the user for their own perusal and use. FIG. 9, Block G demonstrates that the spreadsheet then proceeds to be used by the system to generate insights and visualizations. The system uses clients' financials to generate projections and variances.

FIGS. 10A and 10B, 11A and 11B, and 12A and 12B are examples of input financials which are extracted via "Smart Import," according to example embodiments. The actuals are imported into the software by way of the "smart import" function, which can handle electronic files such as PDF, CSV, Word, etc. This function is able to recognize certain keywords that are present in the line items of financials and then extract the correspondent values. These numbers then can be used by the software in order to create visualizations. Therefore, consumers can use our "smart import" to convert their current files of financial data into a consistent form readily used by our system to create visualization, projections, valuations, etc. This data is also uploaded into a MySQL database so that this information can be utilized by the system when considering other client's data in the future. MySQL is a database management system that uses a MySQL server to store and manage large amounts of data. After this data is stored, the software can use machine learning to analyze historical data in order to generate more improved and more accurate visualizations and projections. The software also uses machine learning to be able to recognize more specific line items during the smart import process in order to accept more specific client financials.

FIG. 13 is a flowchart describing the process for how historical financial data is sorted and visualized, according to example embodiments. Once the system has used the import function to extract the data, the data can then be synthesized, analyzed and visualized for the user. As described in FIG. 13, Block B, the data is reduced down to its component parts, including but not limited to monthly revenues and expenses, the component parts of revenues, varying fees, total secondary revenue, etc. This raw data is then used (FIG. 13, Block D) to create the actuals, projections, and variances. Actuals are financial visualizations of clients' current organizational finances. Projections are financial forecasts in order to predict the company's future so that the company's executives can make sound business decisions. Variances simply show the difference between actuals and budgets, as this information shows how a company is sticking to its planned budgets. All three of these models use the raw data in order to report P&L, Balance Sheet, and Cash Flow statements. A P&L statement, also known as an income statement, shows the revenues, costs, and expenses incurred by a company over a period of time, usually a fiscal quarter or year. This statement shows the ability of a company to generate profit through increase of revenues or decrease of costs. The balance sheet is a financial statement that show the current state of a company's assets, liabilities, and equity at a point in time. The balance sheet is very useful in various financial ratios that demonstrate financial activity, efficiency, solvency, and capital structure. The assets show what the company owns, the liabilities show what the companies owe other entities, and the equity shows the amount invested by shareholders.

Figure 14:
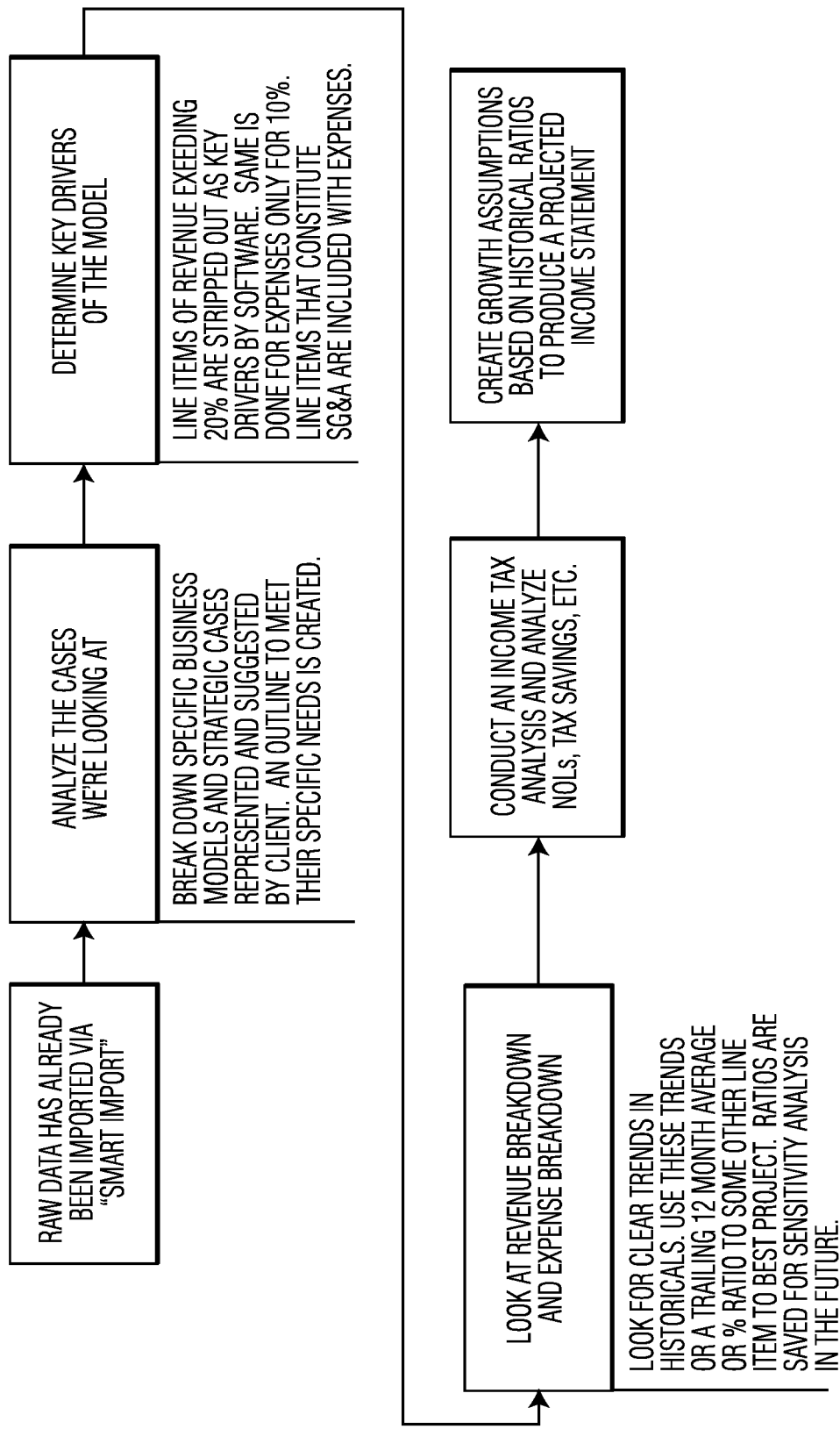
FIG. 14 is a flowchart describing the P&L projection process, according to example embodiments.

FIG. 14 is a flowchart describing the P&L projection process, according to example embodiments. As described in FIG. 14, Block A, the P&L projection process starts by using the raw data that is imported through the "smart import" system that is then broken down into the raw components. FIG. 14, Block B shows the specification process of tailoring the projection model for the client's needs. This can include differing assumptions about approach to sales, changes in marketing strategy, changes in employment, or other potential significant upcoming events that have major financial performance implications. After the client specifies his or her specific needs and assumptions for the model, an outline is created that is ultimately used to generate the projection model for the P&L statement. FIG. 14, Block C follows that after key assumptions are determined, the software determines what are the company-specific key drivers of the model. The software does this specifically by taking respective line items on the P&L statement that exceed 20% of the total revenue items and stripping them out, labeling them as key drivers. The same process is done for the expenses in the P&L statement but lowering the key driver qualification threshold to 10%. After key drivers of the model are determined, FIG. 14, Block D depicts breakdown of revenues and expenses, looking for trends in historical data. These trends are key to projecting the P&L statement out into future years, and the software will increasingly use machine learning as the system is exposed to more and more data. Machine learning allows the software to adapt, becoming more and more accurate every time data is added to it, allowing the software to "learn" essentially in order to build more sophisticated financial models. FIG. 14, Block E describes how tax spending/credits are applied through an income tax analysis where the system will sum up the appropriate tax spends. This information is important in determining the total appropriate cost related to taxes, which is then applied to the income statement as a line item. NOL analysis is appropriate when a net operating loss is taken in a period where a company's allowable tax deductions are greater than its taxable income. When more expenses than revenues are incurred during the period, the net operating loss for the company can be used to recover past tax payments. FIG. 14, Block F shows the aggregation of all the information gathered and synthesized in FIG. 14. Along with the raw data, outline of key assumptions, key drivers, revenue and expense analysis, income tax analysis/NOL analysis, the software can use this information and machine learning to produce a projected P&L statement. The P&L projection is done in conjunction with the projection process of the balance sheet, which is detailed in FIG. 15.

FIG. 15 is a flowchart describing the Balance Sheet projection process, according to example embodiments. As described above, the balance sheet is projected out in conjunction with the P&L statement. FIG. 15, Block A depicts how the data used for the balance sheet projection also comes from the smart import function of the system. The line items that that are pulled via the smart import function include items include on the balance sheet, which depicts a company's holdings at any point in time. The balance sheet is generally broken down into assets, liabilities, and shareholders' equity, and this shows what a company owns and owes at any specific point in time. One of the fundamental rules of accounting is that the numerical value of assets must always equal the sum of the numerical values of liabilities and equities. Assets are any holdings of a company that are either worth money or can reasonably be expected to generate future cash flows for the owner. Liabilities denote what the company owes or is obligated to pay off in the future to external entities. Shareholders' equity includes the owner's claim on the company's holdings after financial liabilities and obligations have been paid off. This category can also include capital received as a part of issuing shares of the company, meaning shareholder's own a portion of the company's worth after obligations are paid off. Because the income statement projections are already made, as described in FIG. 15, Block B, the software then projects out the operations-related line items including accounts receivable, inventory, and accounts payable. As accounts receivable is a balance sheet account that accounts for the money owed to the company from customers for services and products already provided, projections can be made using days sales outstanding analysis, which generally provides information about how long it takes for a customer to pay outstanding invoices. Based on such values and historical trends, the software can project out these operation-related line items. The software also uses ratios between these operation-related items with other line items in order to use historical trends of these ratios to generate projections. Ratios with working capital especially are useful for projections as working capital is the amount of capital that a business uses in its day-to-day operations, so ratios with working capital are very telling about a company' operations. The software then moves on from income statement operations related projections to balance sheet projections including line items falling under current and long-term assets as described in FIG. 15, Block D. The software uses historical data and trends in order to generate statistical projections that match trends but can also account for changes in the future. These projections are based on regression testing, which involves fitting scatterplots of data along models of best fit. Strength of correlation demonstrates how related two different variables are to each other, which helps the software tie different projections together by predicting the direction and scale in which different variables change over time in relation to each other. PP&E, also known as property, plant, and equipment, are projected using a depreciation schedule. The depreciation schedule shows how PP&E will be depreciated over time, and this information can then allow the software to make projections of how much net PP&E will remain each year net of accumulated depreciation. Long-term debt, generally bonds and loans, are projected using debt schedules that show the company's debt obligations every year. The software analyzes the line items related to long term debt and the current maturity of long-term debt, which is the company's obligations within the next year. The software analyzes historical trends of how much principal of the debt is paid off each year in order to project out future values of the long-term debt. The software constructs payment structures in order to project how the debt will be paid off. Projections of shareholders' equity is simply completed by the software because no organic changes occur over time barring specific actions by the company. This can include issuance of stock or additional paid in capital. Retained earnings projections are tied strongly to income statement projections because retained earnings equal net income minus dividends paid out. Again, historical trends and ratios are used to project out net income as done so in the income statement projections process.

Figure 16:
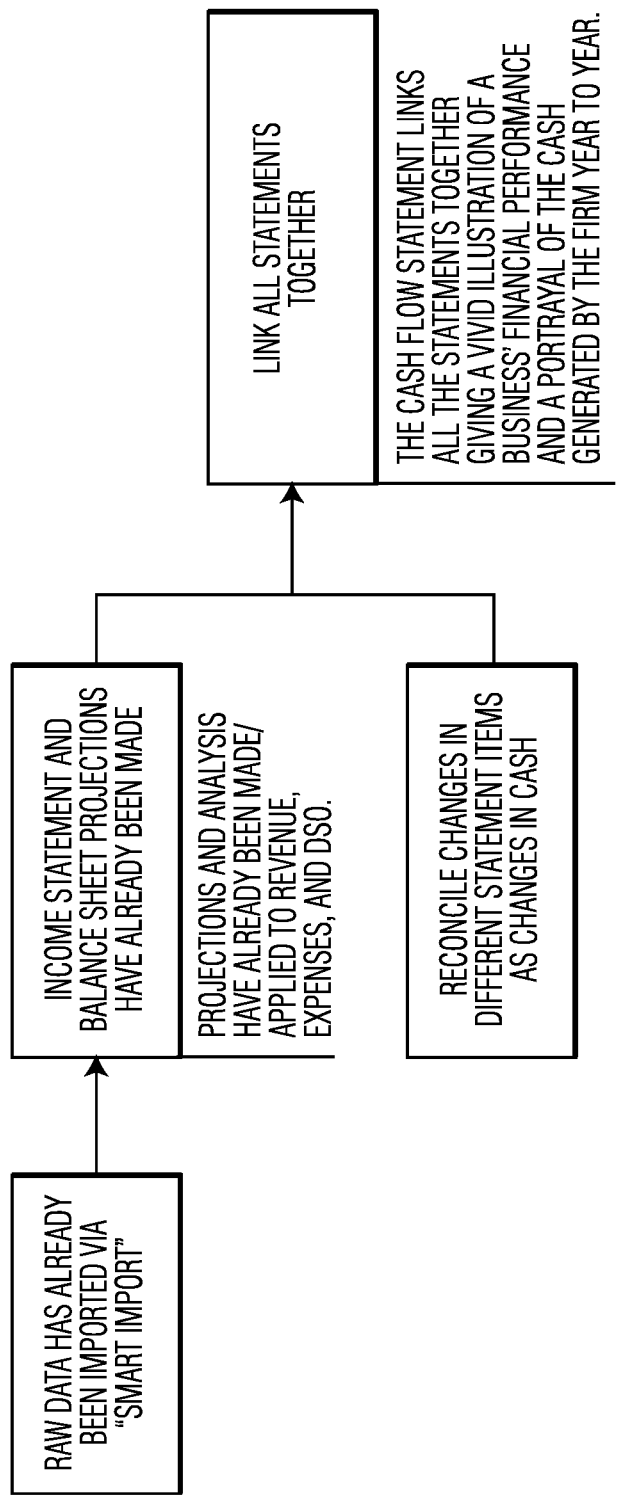
FIG. 16 is a flowchart describing Cash Flows projections process, according to example embodiments.

FIG. 16 is a flowchart describing Cash Flows projections process, according to example embodiments. The cash flow statement represents the cash inflows and outflows of a company relating to operations, financing, and investing. The cash flow statement is not the same as the income statement because it strictly has to do with transactions that involve actual cash. Because net income is based on accrual accounting, non-cash transactions must be reconciled back to cash flows in order to arrive at actual cash flows. Accrual accounting recognizes economic events when they occur, such as revenues and costs, not necessarily when cash actually flows in or out of the company. Because cash flows link different line items already projected out as described in FIGS. 14 and 15, the software simply uses net income and working capital changes in order to arrive at projections for cash flow from operations. Projections for cash flows from financing uses data from any assumptions about debt or equity issuance because cash flows from financing account for cash flows directly related to business financing. Projections for cash flows from investing uses data from long-term asset and liability changes because cash flows from investing include cash flows related to property, plant, and equipment as well as related debt and obligations.

FIG. 17 is a flowchart outlining how the Revenue and EBITDA valuations are arrived at by the system, according to example embodiments. The software will utilize machine learning and pull relevant comparable companies to be used for a multiples-based analysis. Various metrics like size, profitability, industry, maturity state, etc., will all be factored into what comparable companies are selected for analysis. After the multiple has been decided through some kind of weighted average calculation based on the relevance level of each comparable company, the correct P&L line item needs to be selected and multiplied by the multiple (i.e. revenue or EBITDA or EBIT). After the relevant P&L line item is selected, adjustments are made to remove non-recurring events and leave only the recurring part of the metric. Finally, the line item from P&L is multiplied to the multiple and the resultant product is the multiples based valuation for the company.

FIG. 18 is a flowchart outlining how the Net-Asset-Valuation is arrived at by the system, according to example embodiments. Balance sheet data is already imported via the smart import. This kind of valuation is incredibly straightforward. To arrive at the Net-Asset-Valuation, simply take the most recent date assets and subtract the most recent date liabilities. The resultant difference is the net asset valuation.

FIG. 19 is a flowchart outlining how the Discounted Cash Flows valuation is arrived at by the system, according to example embodiments. The DCF valuation is the most intricate valuation of the three methodologies. All the relevant data has already been imported via Smart Import. The first step is to forecast the financial statements 5-10 years (or whatever the forecast horizon is determined to be). Next Key Drivers are identified for both P&L line items and Balance Sheet line items. For the key drivers, various cases are built (bear/base/bull) with +/−5% attached to each line item. For non-key drivers, growth rates are determined for those line items. All these drivers are ratios (ex. Accounts receivable/Revenue, SGA/Revenue) and the movement of these ratios over time is determined based off both historical performance as well as comparable data from markets. After the drivers and forecasts have been done, the Free Cash Flow generated by the firm needs to be calculated for all forecast years. The standard method to calculate Free Cash Flow is to start at EBIT, multiply by (1−tax rate), add back any non-cash expenses, subtract changes in net working capital, and subtract Capital Expenditures. All this information already lies in the financial statements. Once cash flows are calculated, the relevant discount rates need to be calculated. The standard discount rate used for valuation is WACC. The components and formula for WACC are as follows Cost of Equity*Equity Value/Total Value+Cost of Debt*(1−Tax Rate)*Debt Value/Total Value. The Cost of equity is calculated by regressing the excess returns of the company against excess returns of some large index (Russell 3000). The slope of the line is the equity beta, apply some Bloomberg or Blume reversion formula and utilize CAPM to calculate the Cost of equity. The Cost of Debt is calculated utilizing a Credit Rating Model. Based on 5 ratios of the financials, the model outputs a credit rating for the company and add the AA bond yield to the product of the incremental beta (based on credit rating) and the market risk premium. After that, adjustments to the discount rate are made based on a variety of factors (industry, geography, revenue, size) to scale down the company from public company analysis to private company analysis. Once the final discount rate is calculated, discount all forecasted free cash flows using the standard present value calculations (FCF year 1)/(1+WACC)^1+(FCF year 2)/(1+WACC)^2+ . . . (FCF t (1+WACC)^t) where t equals the number of cash flow periods.

FIG. 21 is a flowchart describing the general machine learning (supervised and reinforcement learning) process utilized by the system for varying purposes, according to example embodiments. Machine learning is a type of artificial intelligence that allows computers and computer systems to gradually become more proficient at a specific task. Machine learning is driven by large amounts of data that the computer service can apply statistical operations to in order to make accurate predictions relating to new inputs. Algorithms coded into the computer service allow the service to collect large amounts of data over time, gradually generating more and more accurate outputs. First, the system uses the data sets provided by clients over time, gradually building up the data bank it has to draw on for making predictions. Sample inputs and outputs are also given to the system in order to "train" it, allowing the system to learn what outputs are appropriate for specific inputs. This training process is further improved by a grading system in which the outputs given to the system are "graded" based on how well the outputs correspond to the given inputs. This grading system allows a wider range of understanding for the system so that the system can really "understand" how to handle certain inputs in order to generate the appropriate outputs. A proprietary algorithm is key to the system as the algorithm essentially is the computer code that allows the system to know what exactly to do with new, never before seen inputs. This algorithm, combined with large historical data sets and given sets of inputs and outputs, allows the system to generate accurate outputs based on a novel input received from a user.

The present system may use modern machine learning algorithms and AI techniques that are highly accurate, flexible and self-learning. The system may use machine learning-based document identification and classification techniques. For example, the system may use AI-based techniques for intelligent text extraction. The extraction engine may work dynamically across various document types. The system may use deep learning techniques like natural language processing and image classification to identify document types and extract relevant information with improved accuracy (e.g., 100% accuracy). The solution is deployed on a scalable and self-managed cloud platform.

In some embodiments, predictions may be built using rule-based equations and standardized aggregate functions over past records. The business logic for prediction may be incorporated through rule-based calculations and mathematical computations. Predictions of a company's financial performance are made by using AI-based approach by factoring in elements like past performances, industry trends, market conditions, economy, GDP, and the like. In some embodiments, the training set is thousands of historical financial data of various companies across multiple geographies and multiple industries. The solution is configured to self-learning in a recurring manner.

FIG. 22 is a screenshot of the interface highlighting the one or more components of the system, according to example embodiments. The 'Projections' module is constructed via machine learning (See FIG. 21). The other data that is not shown in FIG. 2 on the dashboard is represented in FIG. 22, which shows the "Performance" tab of the home page. This information is again separated into actuals, projections, and variance. Actuals are the actual statistics of a firm's financial standing, projections forecast how the company will perform in the future in order to aid in informed decisions, and variance shows the difference between actuals and what is budgeted. All three of these Performance sub-tabs are then broken down into the three major financial statements: P&L, Balance Sheet, and Cash Flows. The P&L statement, also known as the income statement, is then broken down into:

Total revenue
  Includes all revenue line items
  Shows breakdown of different revenue streams
Cost of Revenues
  Includes all cost items before gross profit
  Shows breakdown of all cost of revenue line items
Gross Profit
  Shows breakdown of total revenues and cost of revenues
SG&A Expense
  Includes all expense line items before EBITDA
  Shows breakdown of all SG&A expense line items EBITDA
    Shows breakdown of gross profit and SG&A expense
Depreciation & Amortization
EBIT
    Shows breakdown of EBITDA and depreciation and amortization
Interest Expense
    Shows breakdown of total debt outstanding, a calculated interest rate based on the interest expense/total debt outstanding
Income Before Taxes
    Shows 2 bars, 1 for EBIT and 1 for interest expense
Income Tax Expense
    Shows income tax expense and a calculated income tax rate equal to income tax expense/income before taxes
Net Income All of this information in the P&L statement can be displayed as the current month, the last 3, 6, or 12 months, or all time. The balance sheet tab under performance visualizes by month the assets, liabilities, and equity of the companies. Clicking on each separate bar then splits up the three categories further. For example, liabilities are broken down into short-term and long-term liabilities, and then short-term is broken down into debt, accounts payable, accrued expenses, and interest payable. Long-term liabilities is broken down into debt, term loan, capital lease obligations, and deferred income tax. Equity is broken down into additional paid-in-capital, retained earnings, investor equity, and other equity. Assets is broken down into current and noncurrent assets, and current assets are broken down into cash & cash equivalents, accounts receivable, prepaid expenses, and office lease deposits. Non-current assets are broken down into PPE (property, plant, and equipment), goodwill & intangibles, intellectual properties, and value of client relationships/contracts. The cash flow tab in Performance shows consolidated cash flows by month. This aggregate tab can then be broken down into its component parts: cash flows from operations, investing, and financing. Aggregate cash flow represents all of the cash and cash-equivalents being transferred into and out of a business. Cash flows from operations is a measure of the amount of cash generated by a company's normal business operations. This measure is used to indicate whether a company can generate sufficient cash flow to maintain and grow operations. Cash flows from investing is a measure reporting the change in cash position of a company as a result of cash flows having to do with investments in capital assets such as plant and equipment. Cash flows from financing measure all other cash flows of the company, specifically cash flows relating to activities outside of the firm that raise capital. This can include paying investors, adding loans, or issuing stock.

Figure 23:
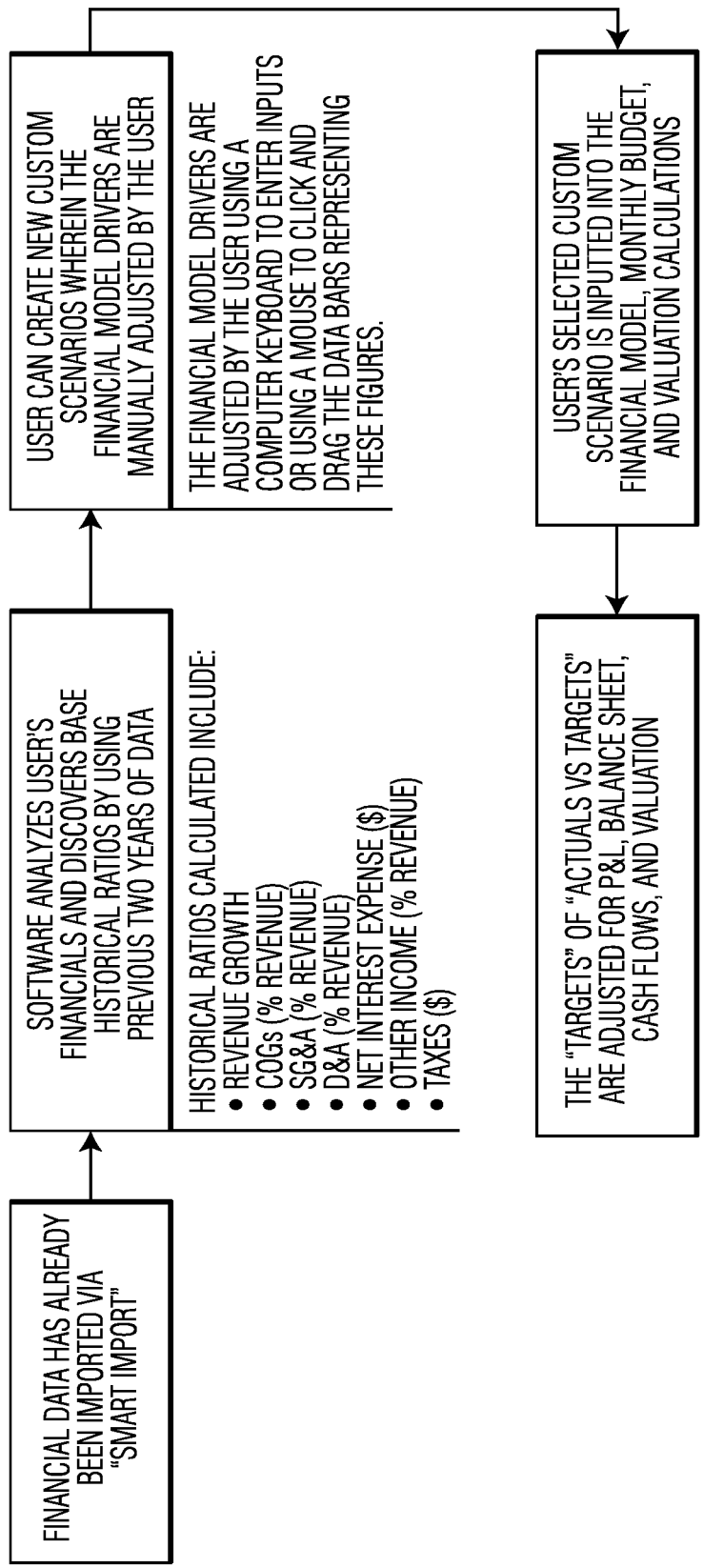
FIG. 23 is a flowchart describing the "Adjust Financial Model Drivers" page within the Financial Model tab of the software, according to example embodiments.

FIG. 23 is a flowchart describing the "Adjust Financial Model Drivers" page within the Financial Model tab of the software, according to example embodiments. FIG. 23, Block A and 23, Block B explain that after a user uploads his financial information via the "Smart Import" function, the software extracts Base Historical Ratios using the past two years of financial data. These "Base Historical Ratios and Expenses" include Revenue Growth, COGs as a percentage of Revenue, SG&A as a percentage of Revenue, D&A as a percentage of Revenue, Net Interest Expense, and Other Income as a percentage of Revenue. However, as demonstrated in FIG. 23, Block C, the user has the ability to create new "Custom Scenarios" in which the aforementioned "Financial Model Drivers" can be adjusted by entering percentage and dollar amounts through a keyboard or using a mouse to click and drag the data bars that represent the "Base Historical Ratios and Expenses." Following the creation of a new, "Custom Scenario," the users new data is inputted into the Financial Model, Monthly Budget, and Valuation calculations in order to create new calculations for the "Targets" for the projected P&L, Balance Sheet, Cash Flow, and Valuation calculations.

Figure 24:
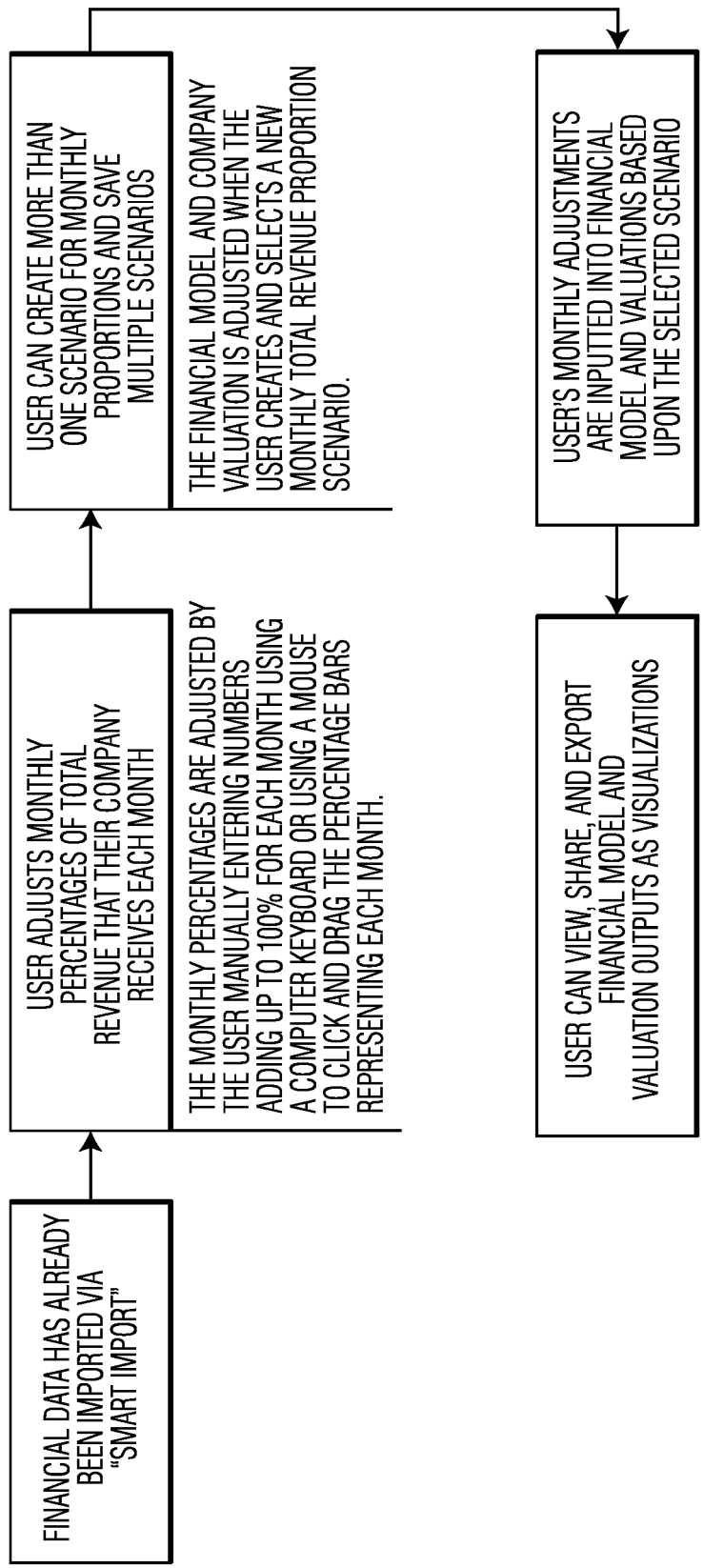
FIG. 24 is a flowchart describing the "Adjust Assumptions" page within the "Monthly Budget" tab of the software, according to example embodiments.

FIG. 24 is a flowchart describing the "Adjust Assumptions" page within the "Monthly Budget" tab of the software, according to example embodiments. FIG. 24, Block A demonstrates that the user has uploaded their relevant financial information through the "Smart Import" feature. From this point, FIG. 24, Block B the user is able to access the "Adjust Assumptions" page in which they have the ability to manually adjust the monthly percentages of total revenue that they expect their company to receive each month for the next fiscal year. The user can adjust such inputs by either entering percentages by typing numerical values on for each month's expected percentage of total revenue, or by clicking and dragging circle icons with a mouse that correspond to the expected monthly proportions of total revenue. FIG. 24, Block C displays that the user has the ability to create more than one scenario for the monthly proportions that they were adjusting in FIG. 24, Block B. In doing so, the user can create a variety of monthly proportions for the scenarios created in FIG. 23 that correspond to different financial expectations in the next fiscal year. From this point, FIG. 24, Block D demonstrates that the scenario created by the user by adjusting their "Financial Model Drivers" in Figure NEW and FIG. 24, block B can now be viewed in the "Monthly Budget" page of the platform. From this point, the user has the ability to view, share, and export their customized financial planning in the "Monthly Budget," "Financial Model," and "Valuations" pages.

In some embodiments, a general-purpose computing device is specifically configured to provide the analysis and visualizations in the form of a service. The components of the computing device may generally include, one or more processors or processing units. The computing device may be described in the general context of computer system executable instructions, such as program modules, being executed by the processor. The computing device and the program modules may be practiced in distributed cloud computing environments where tasks are performed by remote processing devices that are linked through a communications network. In a distributed cloud computing environment, program modules may be located in both local and remote computer system storage media including memory storage devices.

In some embodiments, a system memory may include at least one program product having a set of program modules that are configured to carry out the functions of embodiments of the subject technology. Each of an operating system, one or more application programs, other program modules, and program data or some combination thereof, may include an implementation of a networking environment as an embodiment. The program modules generally carry out the functions and/or methodologies of embodiments of the invention as described above. For example, the program modules may carry out the steps for providing the user platform and user interfaces, retrieving client data, calculating valuations through the various methods described above, and automatically generating for display the valuation data for clients on demand.

As will be appreciated by one skilled in the art, aspects of the disclosed invention may be embodied as a system, method or process, or computer program product. Accordingly, aspects of the disclosed invention may take the form of an entirely hardware embodiment, an entire embodiment (including firmware, resident embodiment, micro-code, etc.) or an embodiment combining embodiment and hardware aspects that may all generally be referred to herein as a "circuit," "module," or "system." Furthermore, aspects of the disclosed technology may take the form of a computer program product embodied in one or more computer readable media having computer readable program code embodied thereon.

Any combination of one or more computer readable media (for example, a storage system) may be utilized. In the context of this disclosure, a computer readable storage medium may be any tangible or non-transitory medium that can contain, or store a program (for example, the program product) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 20:
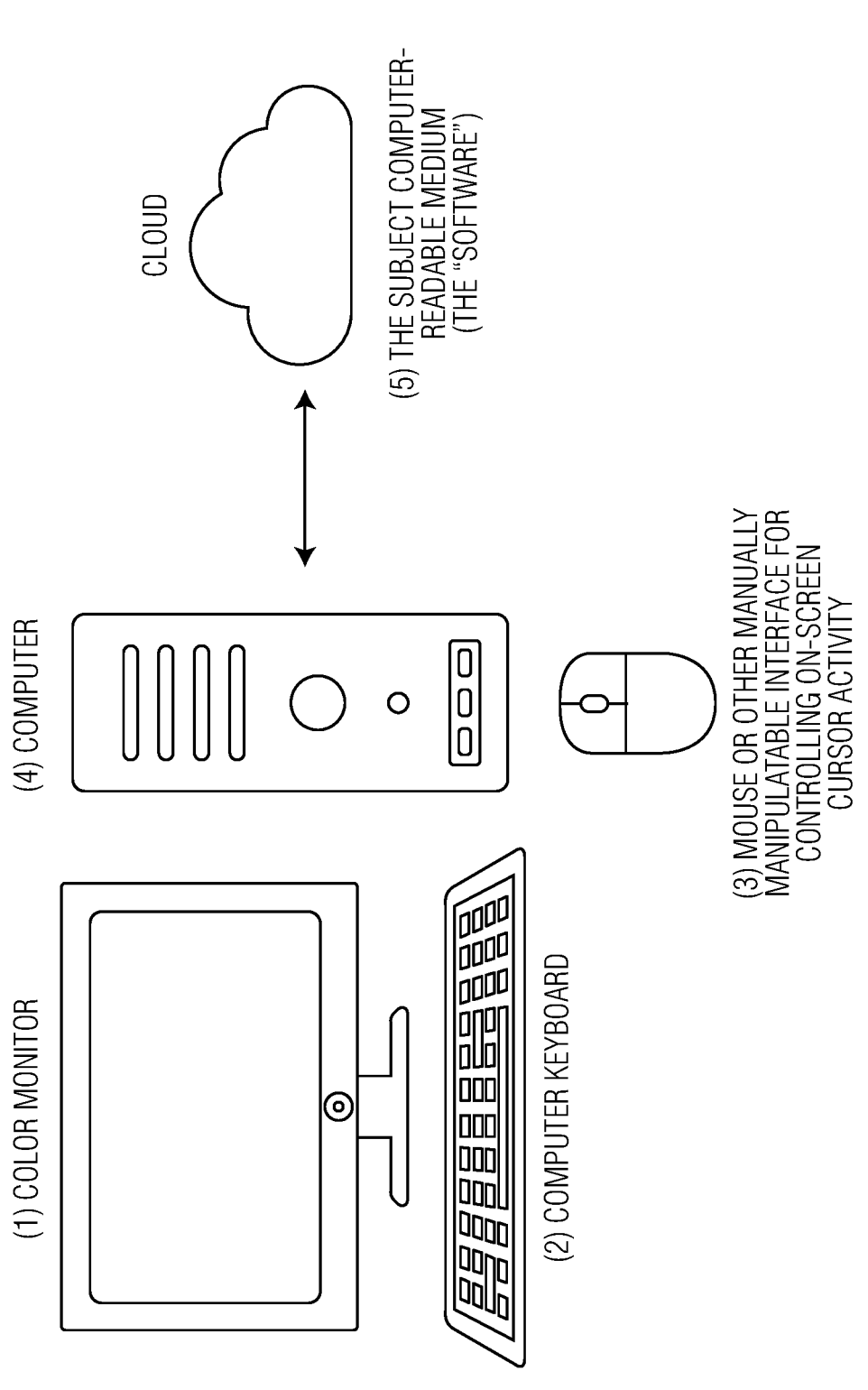
FIG. 20 is a diagram of a computer system/server according to a system of the subject technology, according to example embodiments.

All computer peripherals (color monitor (1), computer keyboard (2) and mouse or other manually manipulatable interface for controlling onscreen cursor activity (3), along with any necessary peripherals to enable perceptible audio output) are connected to the computer (4). The software (5) is stored on the cloud and is accessible via the website. The software is activated by a user through the website and software platform. The user can then utilize all the aforementioned features to gains insights over their company's financials (see, e.g., FIG. 20).

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system for generating financial projections for a business entity and providing a graphical visualization of the financial projections on a display, comprising:
   a processor; and
   a memory having programming instructions stored thereon, which, when executed by the processor performs one or more operations comprising:
      generating a prediction model by:
         training a support vector machine to predict future financial performance of a company based on a training data set comprising historical financial data of a plurality of companies across a plurality of geographies and a plurality of industries,
         grading a performance of the support vector machine based on an output generated from the training data set,
         retraining the support vector machine based on the grading to improve the performance of the prediction model, and
         outputting the prediction model based on the training and the retraining;
      receiving, as an input, financial documents comprising actual financial data of said business entity;
      classifying, by a deep learning processor, each financial document of the financial documents into a document type;
      based on the classified document type, extracting, by a natural language processor, a subset of the actual financial data from the financial documents;
      sorting the subset of the actual financial data into predefined categories,
      uploading the sorted actual financial data into a database,
      generating, via the prediction model, projected financial data by inputting the sorted actual financial data into the support vector machine, wherein the support vector machine is trained to generate the projected financial data by correlating data related to at least past financial performance, industry trends, and market conditions, the projected financial data comprising projected statement of income, projected balance sheet, projected statement of cash flows and variance between said actual financial data and said projected financial data using a plurality of predefined algorithms in conjunction with inputted user selectable variable parameter values, and
      generating graphical visualizations of said actual and projected data; and
      transmitting the graphical visualizations for display in an interactive manner, wherein said projected financial data visualizations are modified in dependence on a user changing one or more of said selectable variable parameter values.

2. The system of claim 1, wherein the one or more operations further comprises:
   generating a classification engine configured to classify the financial documents by:
      compiling a plurality of training documents, wherein the plurality of training documents comprise a plurality of document types;
      training the deep learning processor to classify each of the plurality of training documents according to document type; and
      outputting the classification engine based on the training.

* * * * *